United States Patent
Lisso et al.

(10) Patent No.: US 9,996,805 B1
(45) Date of Patent: Jun. 12, 2018

(54) SYSTEMS AND METHODS FOR AUTOMATED SHIPPING OPTIMIZATION

(71) Applicant: Amazon Technologies, Inc., Seattle, WA (US)

(72) Inventors: Gregory Karl Lisso, Bellevue, WA (US); Sean Maylone, Seattle, WA (US); Sumeet Suresh Vispute, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 15/281,879

(22) Filed: Sep. 30, 2016

(51) Int. Cl.
| | |
|---|---|
| *B65G 57/00* | (2006.01) |
| *B65G 61/00* | (2006.01) |
| *G06Q 10/04* | (2012.01) |
| *G06T 7/00* | (2017.01) |
| *B65G 1/04* | (2006.01) |
| *B65G 1/137* | (2006.01) |
| *G06T 7/73* | (2017.01) |
| *B65B 35/00* | (2006.01) |
| *B65B 5/00* | (2006.01) |
| *G06Q 50/28* | (2012.01) |

(52) U.S. Cl.
CPC ............ *G06Q 10/043* (2013.01); *B65B 5/00* (2013.01); *B65B 35/00* (2013.01); *B65G 1/0464* (2013.01); *B65G 1/1373* (2013.01); *B65G 57/00* (2013.01); *B65G 61/00* (2013.01); *G06T 7/0042* (2013.01); *G06T 7/73* (2017.01); *G05B 2219/40006* (2013.01); *G05B 2219/45056* (2013.01); *G06Q 50/28* (2013.01); *G06T 2207/10004* (2013.01); *Y10S 414/116* (2013.01)

(58) Field of Classification Search
CPC .......... G05B 2219/40006; G05B 2219/45056; Y10S 414/116; B65B 5/00; B65B 35/00; B65G 57/00; B65G 61/00
See application file for complete search history.

(56) References Cited

U.S. PATENT DOCUMENTS

| | | | | |
|---|---|---|---|---|
| 3,586,176 | A * | 6/1971 | Rackman | B25J 9/026 414/792 |
| 5,165,219 | A * | 11/1992 | Sekiguchi | B65B 35/58 53/142 |
| 5,501,571 | A * | 3/1996 | Van Durrett | B65G 61/00 414/21 |
| 5,908,283 | A * | 6/1999 | Huang | B65G 47/90 414/21 |
| 6,349,526 | B1 * | 2/2002 | Newman | B07C 5/10 53/143 |
| 7,084,900 | B1 * | 8/2006 | Watanabe | G06K 9/6203 348/94 |
| 9,102,055 | B1 * | 8/2015 | Konolige | B25J 9/163 |

(Continued)

*Primary Examiner* — Thomas Randazzo
(74) *Attorney, Agent, or Firm* — Patterson + Sheridan, LLP

(57) ABSTRACT

Systems and methods for automated shipping optimization are described herein. In some embodiments, items may be loaded into a receptacle. As items are loaded into a receptacle, a imaging device monitors the items in order to determine if a package is inefficiently oriented in a receptacle. If a package is inefficiently oriented in a receptacle, in some embodiments, the imaging device may send instructions to a robotic device to re-orient the inefficiently oriented item. The imaging device and robotic device, in some embodiments, can monitor multiple receptacles.

20 Claims, 14 Drawing Sheets

(56) References Cited

U.S. PATENT DOCUMENTS

| | | | | |
|---|---|---|---|---|
| 9,205,562 | B1* | 12/2015 | Konolige | B25J 9/1687 |
| 9,327,397 | B1* | 5/2016 | Williams | B25J 3/00 |
| 9,381,645 | B1* | 7/2016 | Yarlagadda | G05B 19/42 |
| 9,409,726 | B2* | 8/2016 | Pape | B65B 3/06 |
| 9,427,874 | B1* | 8/2016 | Rublee | B25J 9/1697 |
| 9,487,357 | B1* | 11/2016 | Miele | B65G 1/1373 |
| 9,630,320 | B1* | 4/2017 | Konolige | B25J 9/163 |
| 9,828,128 | B1* | 11/2017 | Linnell | B65B 59/02 |
| 2004/0086364 | A1* | 5/2004 | Watanabe | B25J 9/0084 414/416.01 |
| 2010/0222915 | A1* | 9/2010 | Kuehnemann | B65G 57/00 700/217 |
| 2014/0270059 | A1* | 9/2014 | Suppes | G01N 23/046 378/20 |
| 2016/0272354 | A1* | 9/2016 | Nammoto | B65B 57/06 |

* cited by examiner

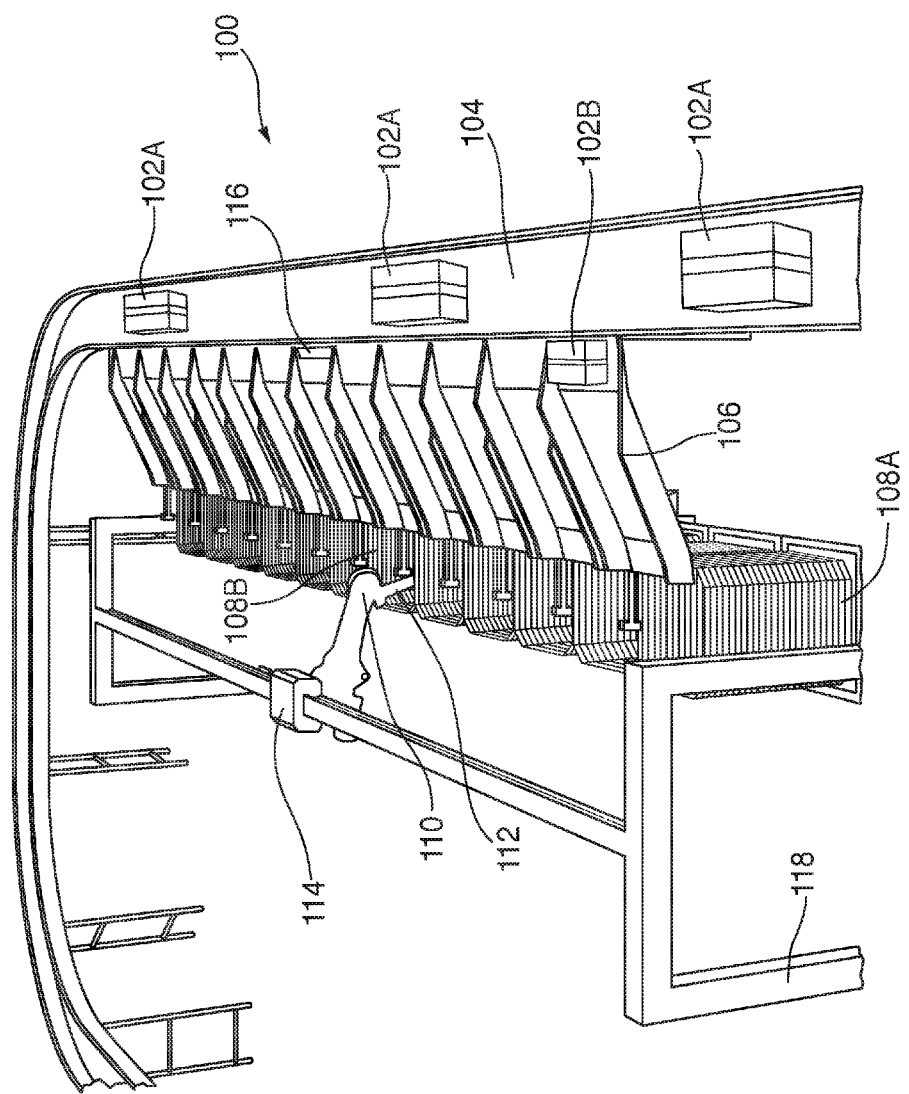

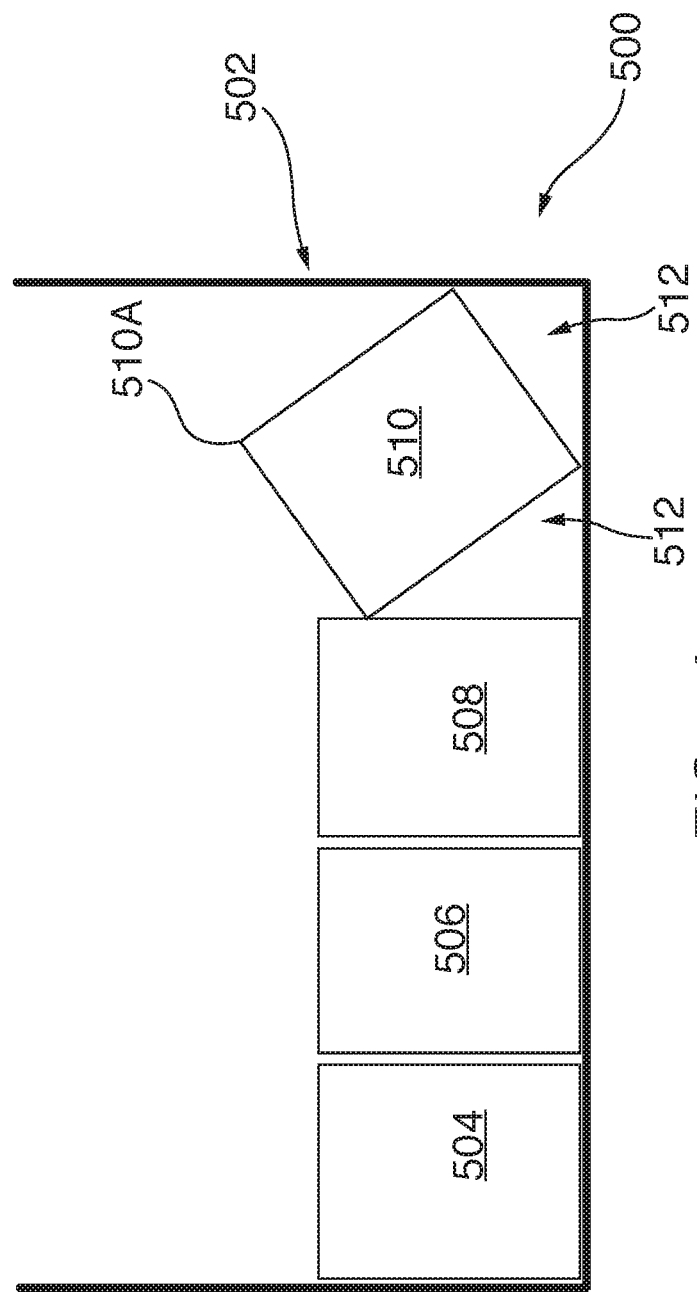

SYSTEMS AND METHODS FOR AUTOMATED SHIPPING OPTIMIZATION

BACKGROUND

Shipping receptacles may be loaded with various types of items. These items may be fed or dropped into shipping receptacles until the shipping receptacles are substantially full. Technical solutions for optimizing the filling of such shipping receptacles are described herein.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 1 is an illustrative schematic of a system for automated loading of items into a receptacle in accordance with various embodiments;

FIG. 5A is an illustrative cross-sectional view of a receptacle with items in accordance with various embodiments;

DETAILED DESCRIPTION

Figure 2A:
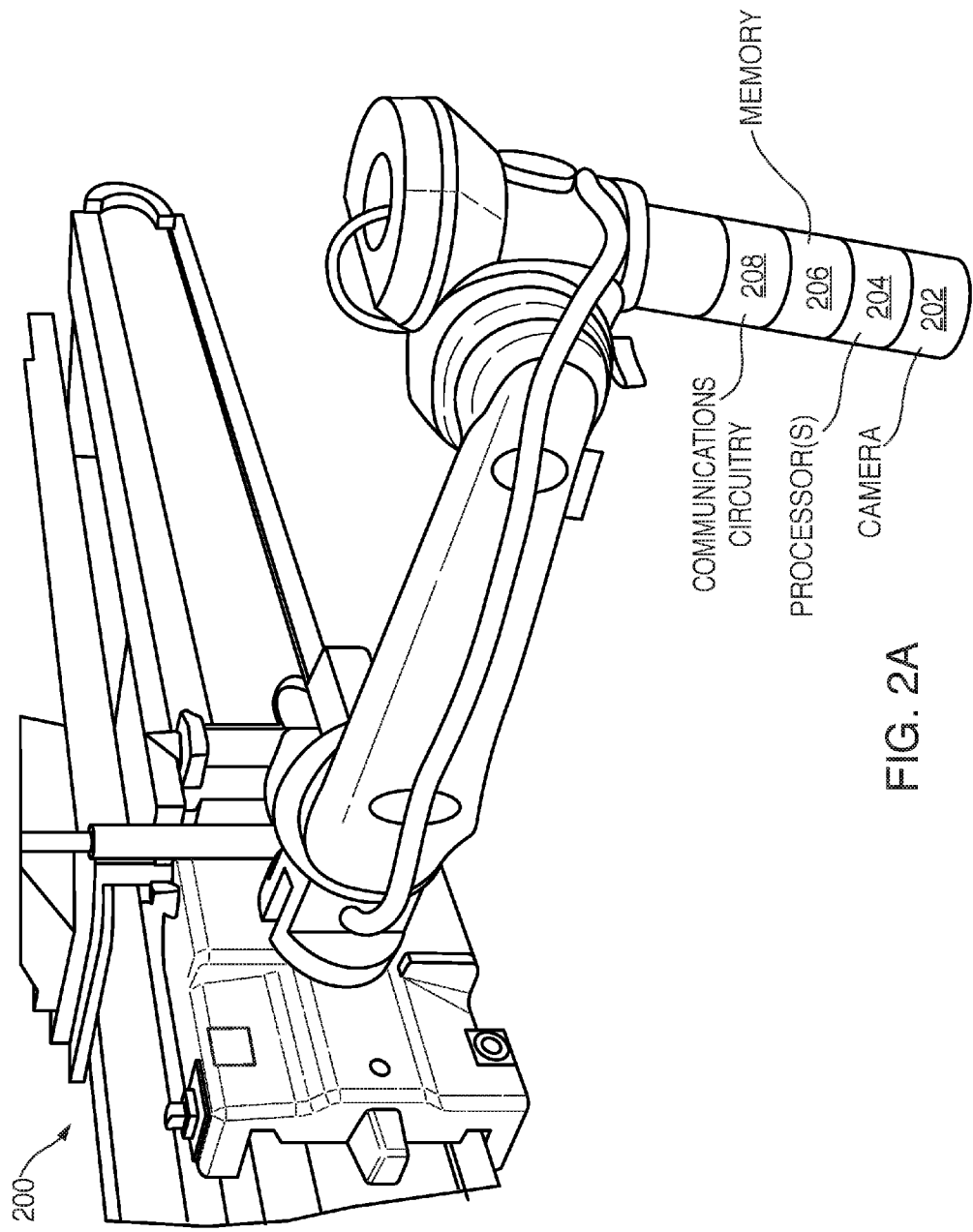
FIG. 2A is an illustrative schematic of an imaging device in accordance with various embodiments.

The present disclosure, as set forth below, is generally directed to systems and methods for optimizing automated systems for filling receptacles with items. In a non-limiting embodiment, items are loaded onto a moving track or conveyor. The moving track, in some embodiments, may be connected to item loaders. As the items move along the track, they may be fed into an item loader where they may slide down and be loaded into a receptacle. As the receptacle is loaded, an imaging device may capture an image of the interior contents of the receptacle. With the captured image, the imaging device may determine an orientation of the items within the receptacle. This information may be used by the imaging device to determine whether one or more items stored within the receptacle are oriented inefficiently. The imaging device may then send instructions to a materials handling system including a robotic device, where the instruction may cause the robotic device to perform a movement designed to change the orientation of a particular item or items that were determined to be oriented inefficiently. In some embodiments, while the robotic device is performing its task, the imaging device may send instructions that prevent items from being loaded into the receptacle.

In some embodiments, after the robotic device performs its task, the imaging device may check to see if some or all of the items within the receptacle are now loaded in an efficient manner. The imaging device, in some embodiments, may perform this check by capturing a second image of the interior contents of the receptacle. With the second image, the imaging device may determine that the items are efficiently oriented in the receptacle. In some embodiments, once the imaging device has determined that the items are sufficiently oriented in the receptacle, the imaging device may send instructions to the track to allow more items to be loaded into the receptacle.

As employed herein, the term "coupled" or "mechanically coupled" shall mean that two or more parts are joined together directly or joined through one or more intermediate parts. As used herein, the term "orientation" may refer to any positioning of any item or structure referenced in this application. As used herein, the term "inefficient orientation" may refer to an orientation of an item that is different than the orientation of another item. Furthermore, the term "inefficient orientation" may also refer to an orientation of an item within a receptacle that does not optimize the space within said receptacle.

FIG. 1 is an illustrative schematic of a system 100 for the automated loading of items into a receptacle in accordance with various embodiments. In some embodiments, system 100 may have first item 102A, which may be located on and moving about a surface of a track 104. Second item 102B may be on a portion of item loader 106, to be loaded into receptacle 108A. First item 102A and second item 102B may be type of item, such as an item that may be packed and shipped. For example, first item 102A and second item 102B may be goods, such as clothes, devices, and/or produce, which may be placed in a variety of different types of packages. The package types may include, but are not limited to, boxes, envelopes, cases, cartons, totes and polybags. Furthermore, persons of ordinary skill will recognize that the various package types may be of any suitable shape, size, and/or configuration, and furthermore may be formed of any suitable material (e.g., plastic, paper, corrugated cardboard, conductive materials, non-conductive materials, and/or any combination thereof, or any other additional material).

In some embodiments, first item 102A and second item 102B can be loaded onto moving track 104. Moving track 104 may be part of any system (e.g., a materials handling system, such as those found in fulfillment centers or distribution facilities) that can automatically load first item 102A and second item 102B into receptacle 108A. In some embodiments, moving track 104 may be a raised structure with a platform that moves at a constant or variable rate of speed. In some embodiments, moving track 104 may have raised edges to prevent items from falling off. Moving track 104, in some embodiments, may be able to communicate with other electronic devices. For example, moving track 104 may be able to receive instructions to move faster, or slower depending on the size of the items on moving track 104. Additionally, in some embodiments, track 104 may be able to receive instructions to prevent items from being loaded into a receptacle, recirculating them around the track until instructions are received to load them into a receptacle. Furthermore, in some embodiments, moving track 104 may have an oval path, allowing items to travel around moving track 104 until they have been loaded into a receptacle. Persons of ordinary skill will recognize that moving track 104 may be constructed in any shape, and the use of oval is merely exemplary and non-limiting.

Item loader 106, in some embodiments, may be connected to moving track 104 such that items may be moved from track 104 to a receptacle via item loader 106. In some embodiments, item loader 106 is slanted in a downward angle to facilitate items moving towards receptacles. For instance, track 104 may be located at a greater height than receptacles 108A, 108B, and therefore item loader 106 may allow an item, such as items 102A, 102B to user gravitational forces to move from track 104 to receptacle 108A, 108B. However, in some embodiments, item loader 106 may not be slanted in a downward angle, and may have a moving platform to facilitate the movement of items (e.g., item loader 106 may include one or more moving tracks or conveyer belts). In some embodiments, item loader 106 may have sensors capable of detecting when a receptacle is full. For example, item loader 106 may include an infrared sensor capable of detecting when items have reached a certain height, such a maximum height of a receptacle. In some embodiments, item loader 106 may be capable of communicating with moving track 104 allowing moving track 104 to stop sending items to a full receptacle.

First receptacle 108A and second receptacle 108B may be any suitable type of receptacle, such as an open top receptacle, that is capable of receiving items. For example, some open top receptacles may include, but are not limited to, gaylords, crates, cages, and air freight containers, however persons of ordinary skill will recognize that this list is merely exemplary. Each receptacle, including first receptacle 108A and second receptacle 108B may have its own station. A station, as used herein, is a location. In some embodiments, a station is where a receptacle is located. A station may also have an imaging device.

Imaging device 110, in some embodiments, may be connected to robot arm 112. Imaging device 110, in some embodiments, may include one or more cameras capable of capturing image information. Image information may include images and videos. Persons of ordinary skill will recognize that the aforementioned list of what image information may include is non-limiting. For example, imaging device 110 may take images of the interior of second receptacle 108B. In some embodiments, using a captured image, imaging device 110 may determine an orientation of items within second receptacle 108B. With this information, imaging device 110 may determine that one of the items is loaded in an inefficient orientation. In some embodiments, imaging device 110 may then send instructions to robotic device 112 to change the orientation of the inefficiently oriented item. In some embodiments, imaging device may take videos to determine the orientation of items within second receptacle 108B. A more detailed description of imaging device 110 is in the description of FIG. 2A.

In some embodiments, imaging device 110 may monitor the orientation of items in a plurality of receptacles. To monitor multiple receptacles, in some embodiments, imaging device 110 may be coupled to robotic device 112. Robotic device 112 may be coupled to structure 118. Using motor 114, imaging device 110 and robotic device 112 may travel back and forth along the structure 118 over a plurality of receptacles. In some embodiments, imaging device 110 may capture an image each time it passes over a receptacle. In some embodiments, imaging device 110 may be mounted in a position where it can monitor multiple receptacles. In some embodiments imaging device 110 may comprise multiple imaging devices to accommodate multiple receptacles.

Once imaging device 110 has determined that an item within a receptacle is out of place, imaging device 110 may send an instruction to robotic device 112 to change the orientation of the item. This instruction, in some embodiments, may contain an exact location of the item that needs to be moved. In some embodiments, the instruction may also include how far the item has to be moved. Robotic device 112 may move the out of place item in any number of ways. For example, robotic device 112 may knock the item over to change its orientation. As another example, robotic device 112 may pick up the item and place it in another orientation. Robotic device 112 may also change the location of an out of place item. For example, first receptacle 108A may have more items on the left side of first receptacle 108A than on the right side. If, first item 102A fell into the left side of first receptacle 108A, imaging device 110 may direct robotic device 112 to move first item 102A to the right side in order to evenly distribute items in first receptacle 108A. In some embodiments, when robotic device 112 is moving an item, imaging device 110 may send an instruction to moving track 104 to stop allowing items to be sent to one or more receptacles. For example, as shown in FIG. 1, when robotic device 112 is moving an item in second receptacle 108B, imaging device 110 sent an instruction to moving track 104 to stop sending items to second receptacle 108B. In response, wall 116 was raised, preventing items from getting into the feeder for second receptacle 108B. In some embodiments, wall 116 may be replaced by a logic system that prevents items from being loaded while robotic device 112 is working. This may be accomplished using a system or systems connected to system 100. A more detailed explanation of robotic device 112 is below in the description of FIG. 2B.

FIG. 2A is an illustrative schematic of imaging device 200 in accordance with various embodiments. Imaging device 200, in some embodiments, may include camera 202, one or more processor(s) 204, memory 206, and communications circuitry 208. However, one or more additional components may be included within imaging device 200, and/or one or more components may be omitted or located separately from the other elements of the imaging device 200. For example, the processor and memory could be housed remotely from the remaining components of the imaging device, communicating with the remaining components through the communications circuitry or other known communications expedients. Furthermore, while multiple instances of one or more components may be included within imaging device 200, for simplicity only one of each component has been shown.

Camera 202 may be any device that can record visual images in the form of photographs, film, or video signals. In one exemplary, non-limiting embodiment, camera 202 is a digital camera that encodes digital images and videos digitally and stores them on local or cloud-based memory.

Processor(s) 204 may include any suitable processing circuitry capable of controlling operations and functionality of imaging device 200, as well as facilitating communications between various components within imaging device 200. In some embodiments, processor(s) 204 may include a central processing unit ("CPU"), a graphic processing unit ("GPU"), one or more microprocessors, a digital signal processor, or any other type of processor, or any combination thereof. In some embodiments, the functionality of processor(s) 204 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 204 may include its own local memory, which may store program modules, program data, and/or one or more operating systems. However, processor(s) 204 may run an operating system ("OS") for imaging device 200, and/or one or more firmware applications, media applications, and/or applications resident thereon.

In some embodiments, imaging device 200 may communicate with a separate system or device(s) that has one or more processors. In such embodiments, the processing of the image information may be accomplished using a separate system or device(s).

Memory 206 may include one or more types of storage mediums such as any volatile or non-volatile memory, or any removable or non-removable memory implemented in any suitable manner to store data on imaging device 200. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory 206 may be implemented as computer-readable storage media ("CRSM"), which may be any available physical media accessible by processor(s) 204 to execute one or more instructions stored within memory 206. In some embodiments, one or more applications (e.g., gaming, music, video, calendars, lists, etc.) may be run by processor(s) 204, and may be stored in memory 206.

Communications circuitry 208 may include any circuitry allowing or enabling imaging device 200 to communicate with one or more devices, servers, and/or systems. For example, communications circuitry 208 may facilitate communications between imaging device 200 and robotic device 250 (shown in FIG. 2B). As another example, communications circuitry 208 may facilitate communications between imaging device 200 and moving track 104. In some embodiments, imaging device 200 may include an antenna to facilitate wireless communications with a network using various wireless technologies (e.g., Wi-Fi, Wi-Fi Direct, Bluetooth®, radiofrequency, etc.). In yet another embodiment, imaging device 200 may include one or more universal serial bus ("USB") ports, one or more Ethernet or broadband ports, and/or any other type of hardwire access port so that communications circuitry 208 allows imaging device 200 to communicate with one or more communications networks.

Imaging device 200, in some embodiments, may determine the orientation of an item. To determine the orientation of an item, imaging device 200 may use camera 202 to capture one or more images. For example, after camera 202 captures an image, imaging device 200 may use processor(s) 204 to analyze the image data representing the captured image.

In some embodiments, processor(s) 204 may process the image information from camera 202 using edge detection. Edge detection, in a non-limiting exemplary embodiment, may look for distinct differences in light data from the captured image. The differences in light data help processor(s) 204 determine an edge of an item in the captured image. After determining an edge, processor(s) 204 may look for data from nearby pixels to determine where similar differences in light exist in the captured image. Processor(s) 204 may continue to look for similar differences in light until an entire outline of the item has been found. In some embodiments, processor(s) 204 may continue analyzing the captured image until the edges of all of the items within the captured image. This analysis, in some embodiments, may enable imaging device 200 to determine if one or more items is in one or more predefined orientations, such as placed on a particular side, resting against another item within a receptacle, resting against a side wall of a receptacle, and the like.

In some embodiments processor(s) 204 may process the image information from camera 202 using clustering. Clustering allows processor(s) 204 to develop an image using the data captured by camera 202. When clustering, in some embodiments, processor(s) 204 may look for pixels that have identical data within the captured image. Processor(s) 204 may then look for pixels that have the same data or nearly the same data as the identical data pixels. After all of the pixels are gathered and analyzed, processor(s) 204 may determine the item within the receptacle based on captured image. In some embodiments, processor(s) 204 may continue analyzing the captured image until processor(s) 204 has determined all of the items within the captured image. This analysis, in some embodiments, may enable imaging device 200 to determine if one or more items is in an inefficient orientation.

In some embodiments, processor(s) 204 may use either edge detection or clustering or both to determine if one or more items is in an inefficient orientation. Persons of ordinary skill recognize that edge detection and clustering are two non-limiting examples of how imaging device 200 may determine which items, if any, are in an inefficient orientation. In some embodiments, camera 202 may be more than one camera placed at different angles. This would allow imaging device 200 to get a three dimensional image of the contents in a receptacle. In another embodiment, imaging device 200 may also use laser scanners instead of, or in combination with camera 202.

Figure 2B:
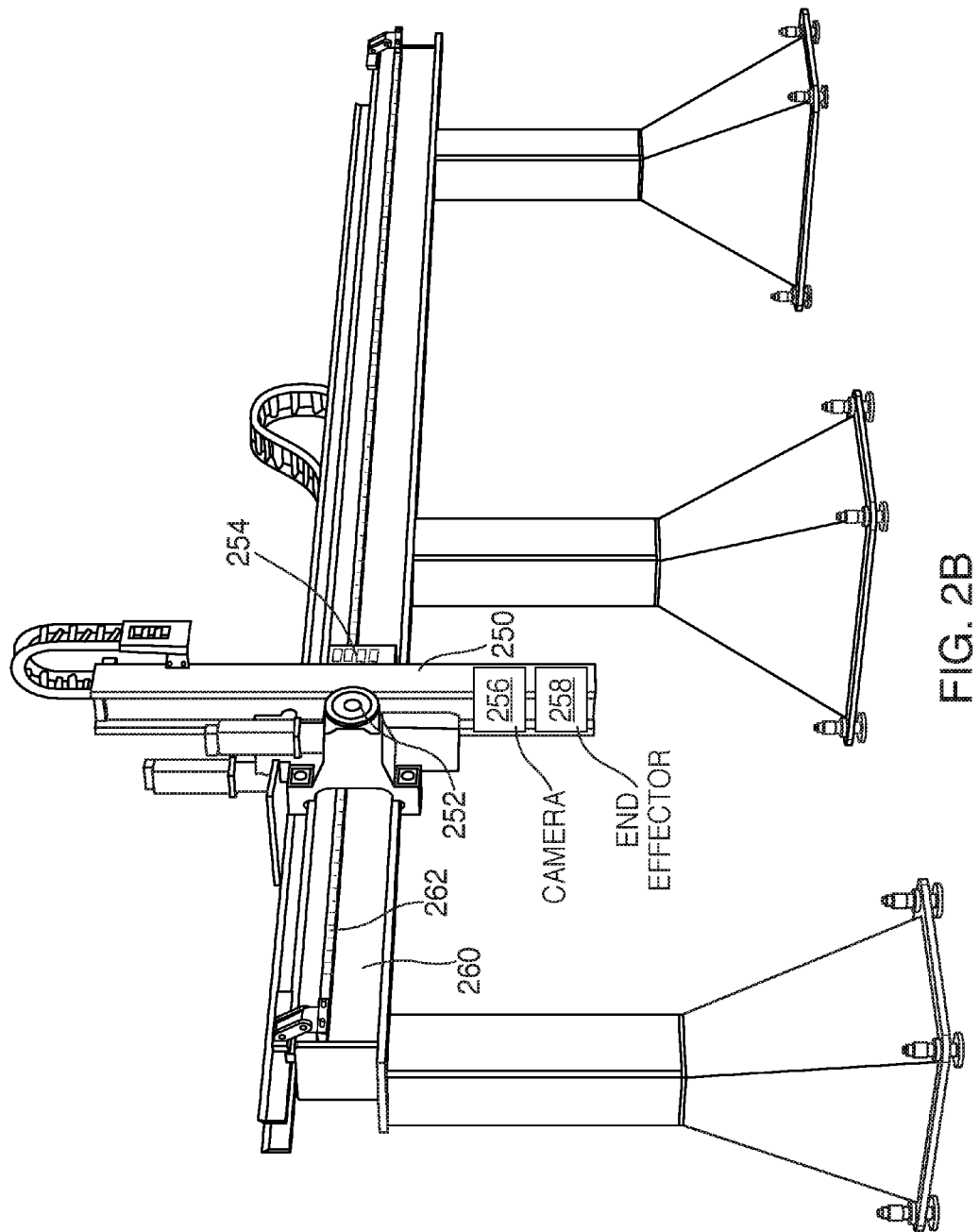
FIG. 2B is an illustrative schematic of a robotic device in accordance with various embodiments.

FIG. 2B is an illustrative schematic of robotic device 250 in accordance with various embodiments. Robotic device 250 may be any type of machine that is capable of moving items within a receptacle in response to receiving instructions to move. Some examples of robotic devices include, but are not limited to a Cartesian robot, Gantry robot, cylindrical robot, spherical robot, SCARA robot, articulated robot, parallel robot, anthropomorphic robot, and autosampler. Persons of ordinary skill will recognize that this list is non-limiting and any type of robotic device may be used.

Robotic device, in some embodiments, may include motor 252 and motion sensor 254. Motor 252 may be any type of motor. For example, motor 252 may be a step motor. In some embodiments, a step motor may move in exact increments, allowing precise movements. In some embodiments, motor 252 may use hydraulics or pneumatics. Sensor 254 may be any type of sensor. For example, sensor 254 may be a range finder. This would allow robotic device 250 to determine how far away robotic device 254 is from items within a receptacle. Persons of ordinary skill will recognize that a range sensor is a non-limiting example and any time of sensor may be used in conjunction with robotic device 250.

In some embodiments, robotic device 250 may have multiple segments joined by multiple joints. Each joint, in some embodiments, may have a step motor. In some embodiments, each step motor may move in exact increments, allowing precise movements.

Robotic device 250, in some embodiments, may be coupled to structure 260. Structure 260, in some embodiments, may include track 262. Track 262 may be configured such that robotic device may move along a horizontal axis. In some embodiments, structure 260 and track 262 may be the same width as one receptacle allowing robotic device 260 to move from one end of a receptacle to another. This embodiment is described in more detail below with reference to FIG. 3. In some embodiments, structure 260 and track 262 may be wide enough to accommodate multiple receptacles. This width would allow robotic device 260 to move to and adjust items in multiple receptacles. This embodiment is described in more detail below with reference to FIG. 4.

In some embodiments, robotic device 250 may also include a camera 256 and an end effector 258. Camera 256 may be any device that can record visual images in the form of photographs, film, or video signals. In one exemplary, non-limiting embodiment, camera 256 is a digital camera that encodes images and/or videos digitally and stores them on local or cloud-based memory. End effector 258 may be any device capable of interacting with the surroundings of robotic device 250. For example, end effector 258 may be an impactive end effector with claws that can grasp items in a receptacle. As another example, end effector 258 may be an astrictive end effector that can use suction forces to move items within a receptacle. Persons of ordinary skill will recognize that the above examples are non-limiting and are merely exemplary. The type of end effector utilized may depend on the types of items being manipulated, and may be removable to enable different end effectors to be used under different circumstances and use cases.

Figure 3:
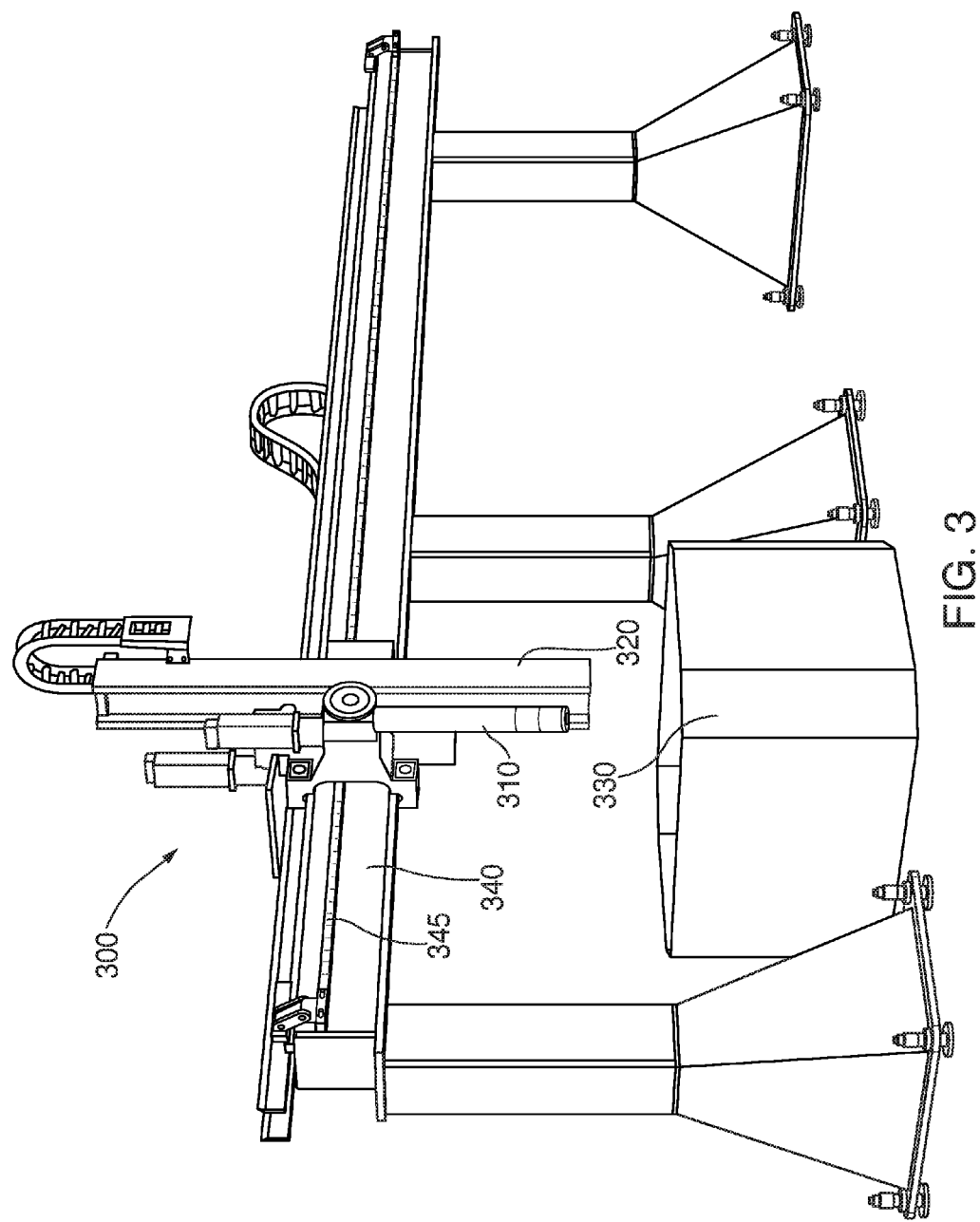
FIG. 3 is an illustrative schematic of another system for automated loading of items into a receptacle in accordance with various embodiments.

FIG. 3 is an illustrative schematic of system 300 for the automated loading of items into a receptacle in accordance with various embodiments. System 300 may include imaging device 310, robotic device 320, receptacle 330, and structure 340. Imaging device 310, may be similar to imaging device 200 of FIG. 2A and the same description applies. Robotic device 320 may be similar to robotic device 250 of FIG. 2B and the same description applies. Receptacle 330 may be similar to first receptacle 108A of FIG. 1 and second receptacle 108B of FIG. 1 and the same description applies. Structure 340 may be similar to structure 260 and the same description applies. In some embodiments, imaging device 310 and robotic device 320 may be coupled to structure 340. Furthermore, in some embodiments, imaging device 310 and robotic device 320 may run along track 345 of structure 340. Track 345 may be similar to track 262 and the same description applies. Receptacle 330, may contain one or more items.

In some embodiments, imaging device 310 may capture an image of receptacle 330. The captured image may contain a plurality of items within receptacle 330. The plurality of items, in some embodiments, may have one item that has an inefficient orientation. If this is the case, imaging device 310, may detect the item with an inefficient orientation and send instructions to robot arm 320 to move the item with an inefficient orientation. The instructions sent to robot arm 320 may also contain the location of the item with an inefficient orientation. In some embodiments, the instructions may also inform robot arm 310 on the distance an item needs to be moved. Once the instructions are received, robot arm 320 may move along track 345 in order to position robot arm 320 in a location where robot arm 320 may move the item in an inefficient orientation. Once positioned, robot arm 320 may lower into receptacle 330 and move the item into a different orientation. Robot arm 320 may move the item in a variety of ways. For example, robot arm 320 may simply knock over the item so it is in line with the other items. As another example, robot arm 320 may lift the item and place it in a more efficient orientation. These two examples are non-limiting and persons of ordinary skill recognize that robot arm 320 can move items within a receptacle in any number of ways.

Figure 4:
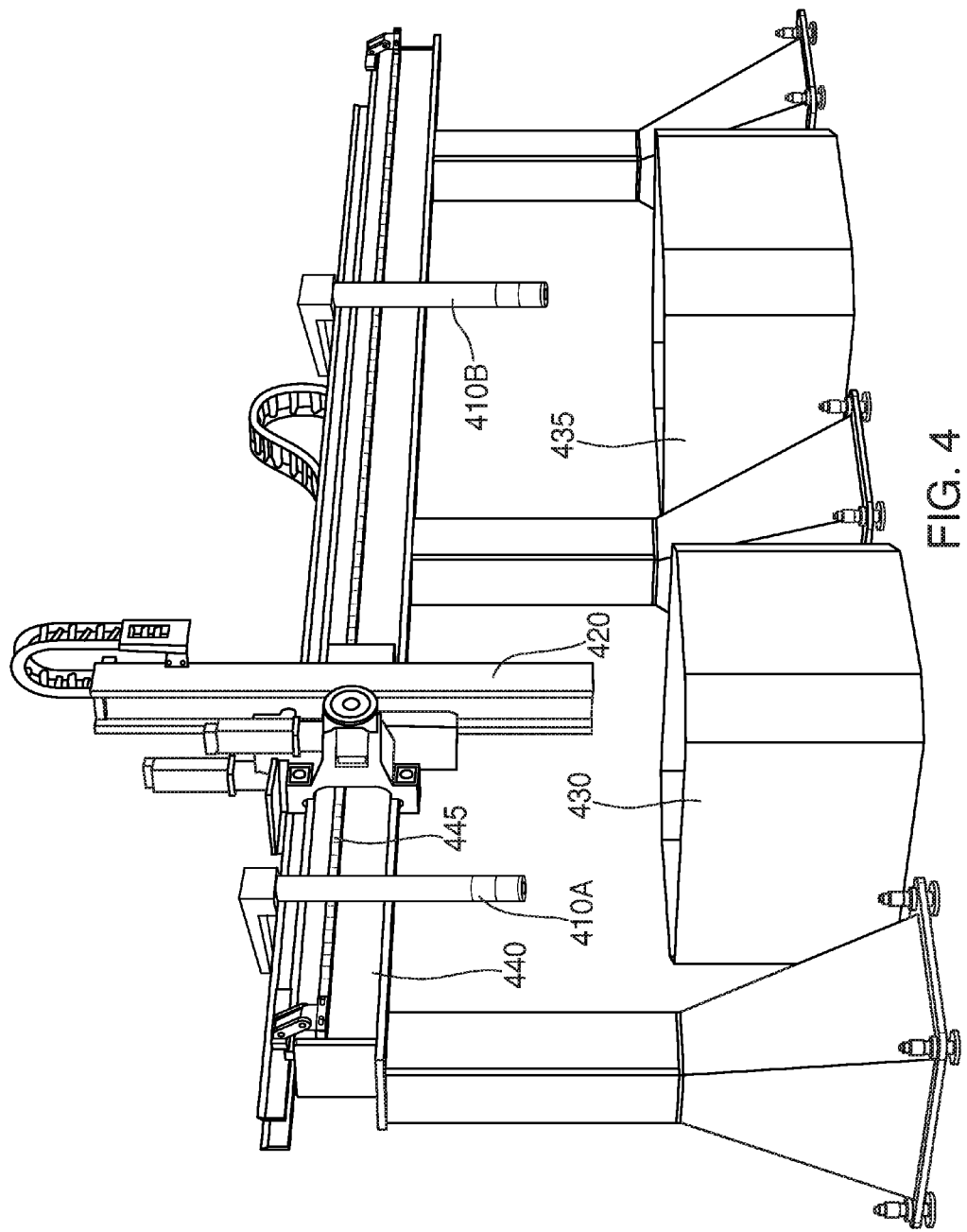
FIG. 4 is an illustrative schematic of a system for automated loading of items into a receptacle in accordance with various embodiments.

FIG. 4 is an illustrative schematic of system 400 for the automated loading of items into a receptacle in accordance with various embodiments. System 400 may include first imaging device 410A, second imaging device 410B robotic device 420, first receptacle 430, second receptacle 435 and structure 340. First imaging device 410A and second imaging device 410B, may be similar to imaging device 200 of FIG. 2A and the same description applies. Robotic device 420 may be similar to robotic device 250 of FIG. 2B and the same description applies. First receptacle 430 may be similar to first receptacle 108A of FIG. 1 and second receptacle 108B of FIG. 1 and the same description applies. Second receptacle 435 may be similar to first receptacle 108A of FIG. 1 and second receptacle 108B of FIG. 1 and the same description applies. Structure 440 may be similar to structure 260 and the same description applies. In some embodiments, imaging device 410 and robotic device 420 may be coupled to structure 440. Furthermore, in some embodiments, imaging device 410 and robotic device 420 may run along track 445 of structure 440. Track 445 may be similar to track 262 of FIG. 2B and the same description applies. First receptacle 430 and second receptacle 435, may contain one or more items.

In some embodiments, first imaging device 410A and second imaging device 410B may be sending instructions to robotic device 420 causing robotic device 420 to move along track 445 between first receptacle 430 and second receptacle 435. First imaging device 410A may be capturing images of first receptacle 430 and second imaging device 410B may be capturing images of second receptacle 435. In some embodiments, first imaging device 410A may capture image information containing a captured image of a plurality of items within first receptacle 430. The plurality of items, in some embodiments, may have one item that has an inefficient orientation. If this is the case, first imaging device 410A, may detect the item with an inefficient orientation and send instructions to robot arm 420 to move the item with an inefficient orientation. The instructions sent to robot arm 420 may also contain the location of the item with an inefficient orientation. In some embodiments, the instructions may also inform robot arm 420 on the distance an item needs to be moved. Once the instructions are received, robot arm 420 may move along track 445 in order to position robot arm 420 in a location where robot arm 420 may move the item in an inefficient orientation. Once positioned, robot arm 420 may lower into first receptacle 430 and move the item into a different orientation. Robot arm 420 may move the item in a variety of ways. For example, robot arm 420 may simply knock over the item so it is in line with the other items. As another example, robot arm 420 may lift the item and place it in a more efficient orientation. These two examples are non-limiting and persons of ordinary skill recognize that robot arm 420 can move items within a receptacle in any number of ways.

FIGS. 5A-5D are examples of items inefficiently oriented in receptacles. Persons of ordinary skill recognize that these examples are non-limiting.

FIG. 5A is an illustrative cross-sectional view 500 of receptacle 502 with items in accordance with various embodiments. Receptacle 502 may be similar to first receptacle 108A of FIG. 1 and second receptacle 108B of FIG. 1 and the same description applies. In some embodiments, receptacle 502 may include first item 504, second item 506, third item 508, and fourth item 510. First item 504, second item 506, third item 508, and fourth item 510 may be similar to first item 102A and second item 102B of FIG. 1 and the same description applies. As shown in FIG. 5A, first item 504, second item 506, and third item 508 have similar orientations. First item 504, second item 506, and third item 508 are lined side to side and do not have a lot of wasted space within receptacle 502. This is one, non-limiting example, of items being efficiently oriented. Fourth item 510 has a different orientation that first item 504, second item 506, and third item 508. This does not necessarily mean that fourth item 510 is in an inefficient orientation.

However, as shown in FIG. 5A, fourth item 510 is laying on its edge. The orientation of fourth item 510 has wasted space 512. Wasted space 512, may be any unused space within a receptacle. In some embodiments, wasted space 512 may be space that cannot be filled by another item because of the orientation of an item currently within a receptacle. Because of fourth item 510 is laying on its edge and because fourth item 510 causes wasted space 512, fourth item 510 is in an inefficient orientation. Persons of ordinary skill recognize that this is a non-limiting example of an inefficient orientation. Furthermore, persons of ordinary skill recognize that sometimes packages resting on their edges is the most efficient way to pack an item. Inefficient orientation is determined on a case-by-case basis depending on, among other factors, the size of the receptacle, the shape of the receptacle, the size of the items, and the shape of the items. In some embodiments, because of the shape of the receptacle or item, wasted space 512 is necessary.

In some embodiments, the imaging device may have dimensions of receptacle 502 stored in its memory. Memory, as used herein, may be similar to memory 206 of FIG. 2A and the same description applies. After the imaging device captures an image, one or more of its processors may compare the dimensions of the items within receptacle 502 to the known dimensions of receptacle 502. One or more processors, as used herein, may be similar to processor(s) 204 of FIG. 2A and the same description applies. This comparison may help determine whether an item is inefficiently oriented.

Figure 5B:
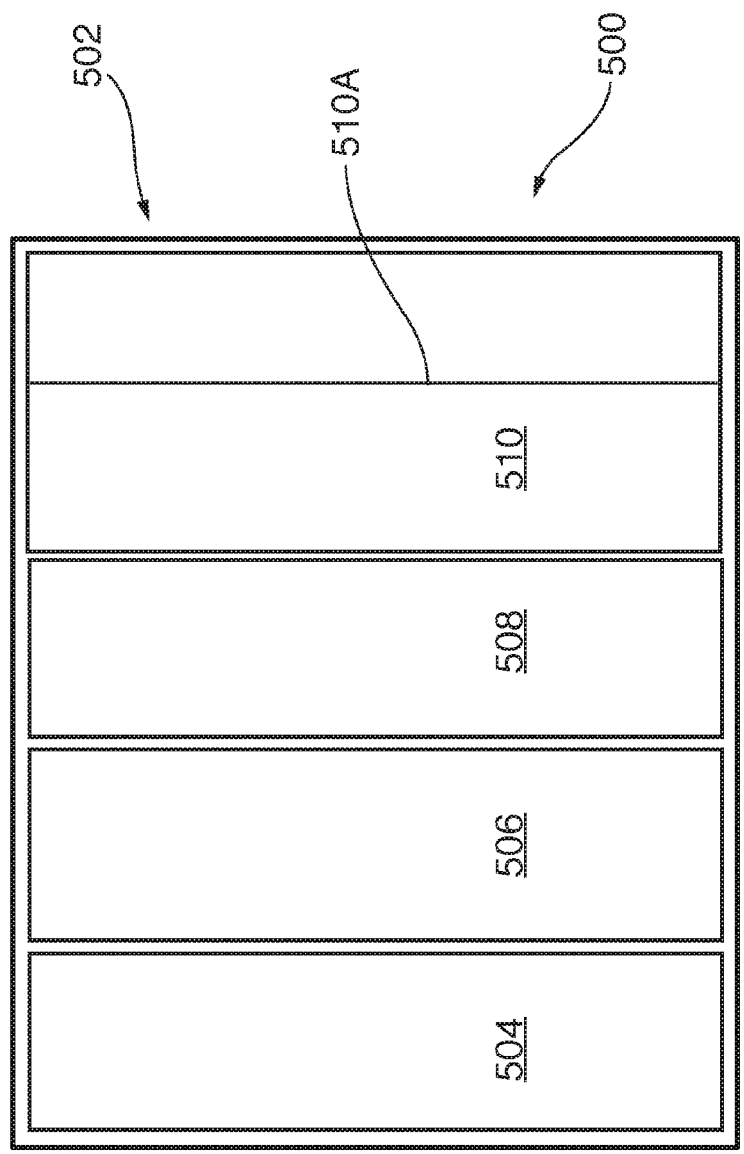
FIG. 5B is a top view of the illustrative cross-sectional view of the receptacle with items in FIG. 5A in accordance with various embodiments.

FIG. 5B is a top view 500B of the illustrative cross-sectional view of receptacle 502 with items in FIG. 5A in accordance with various embodiments. FIG. 5B shows what an image device might capture when looking at a receptacle. As shown in FIG. 5A, fourth item 510 is inefficiently oriented. An image device may process captured image information and determine that edge 510A is higher than first item 504, second item 506, and third item 508. From this, an image device may determine that fourth item 510 needs to be re-oriented. The image device of FIG. 5B may be similar to image device 200 of FIG. 2A and the same description applies.

Figure 5C:
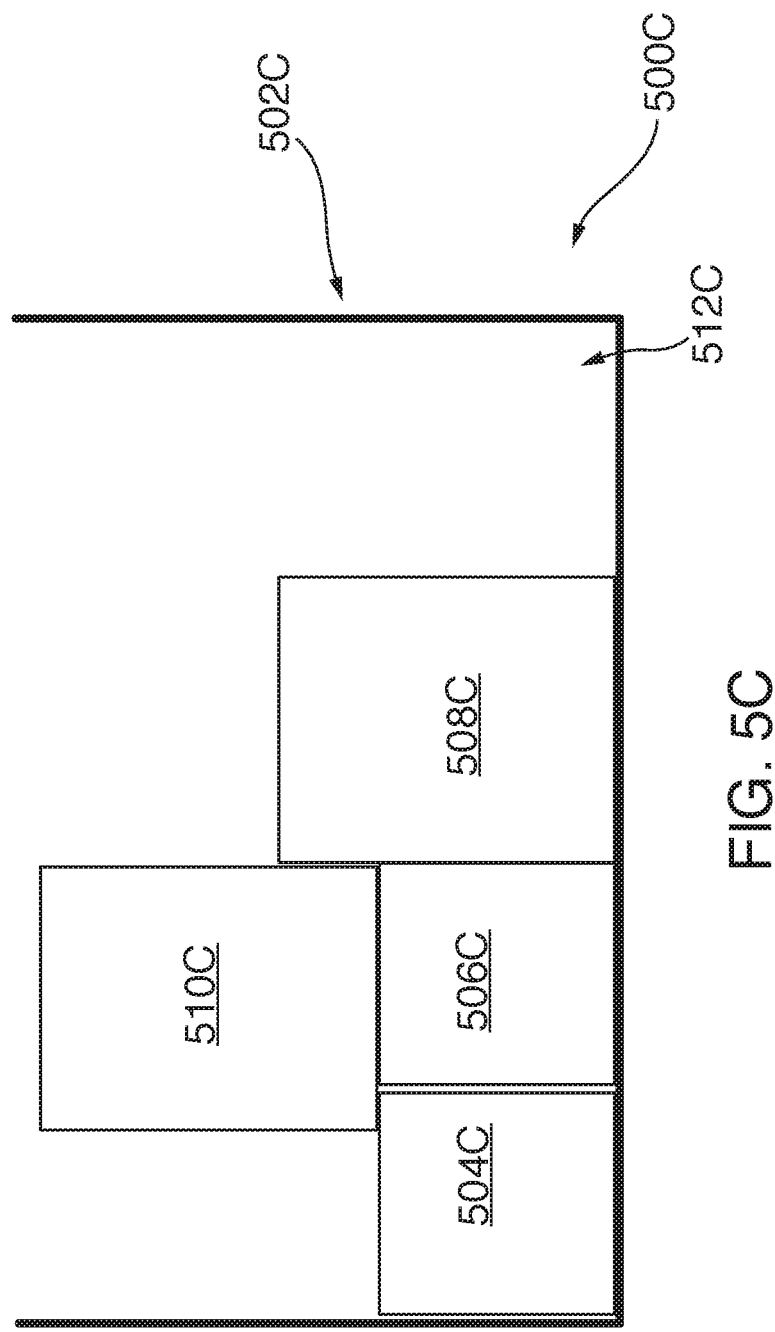
FIG. 5C is an illustrative cross-sectional view of a receptacle with items in a different arrangement in accordance with various embodiments.

FIG. 5C is an illustrative cross-sectional view 500C of receptacle 502C with items in a different arrangement in accordance with various embodiments. Receptacle 502C may be similar to first receptacle 108A of FIG. 1 and second receptacle 108B of FIG. 1 and the same description accordingly applies. In some embodiments, receptacle 502C may include first item 504C, second item 506C, third item 508C, and fourth item 510C. First item 504C, second item 506C, third item 508C, and fourth item 510C may be similar to first item 102A and second item 102B of FIG. 1 and the same description applies. As shown in FIG. 5C, first item 504C, second item 506C, and third item 508C form a layer of items. In some embodiments, the layer of packages has empty space 512C. Fourth item 510C was loaded on top of the layer of items (first item 504C, second item 506C, third item 508C), leaving empty space 512C. An imaging device, in some embodiments, may determine that fourth item 510C is inefficiently oriented. This may be because, for example, fourth item 510C is on top of a layer of items instead of filling in empty space 512C.

Figure 5D:
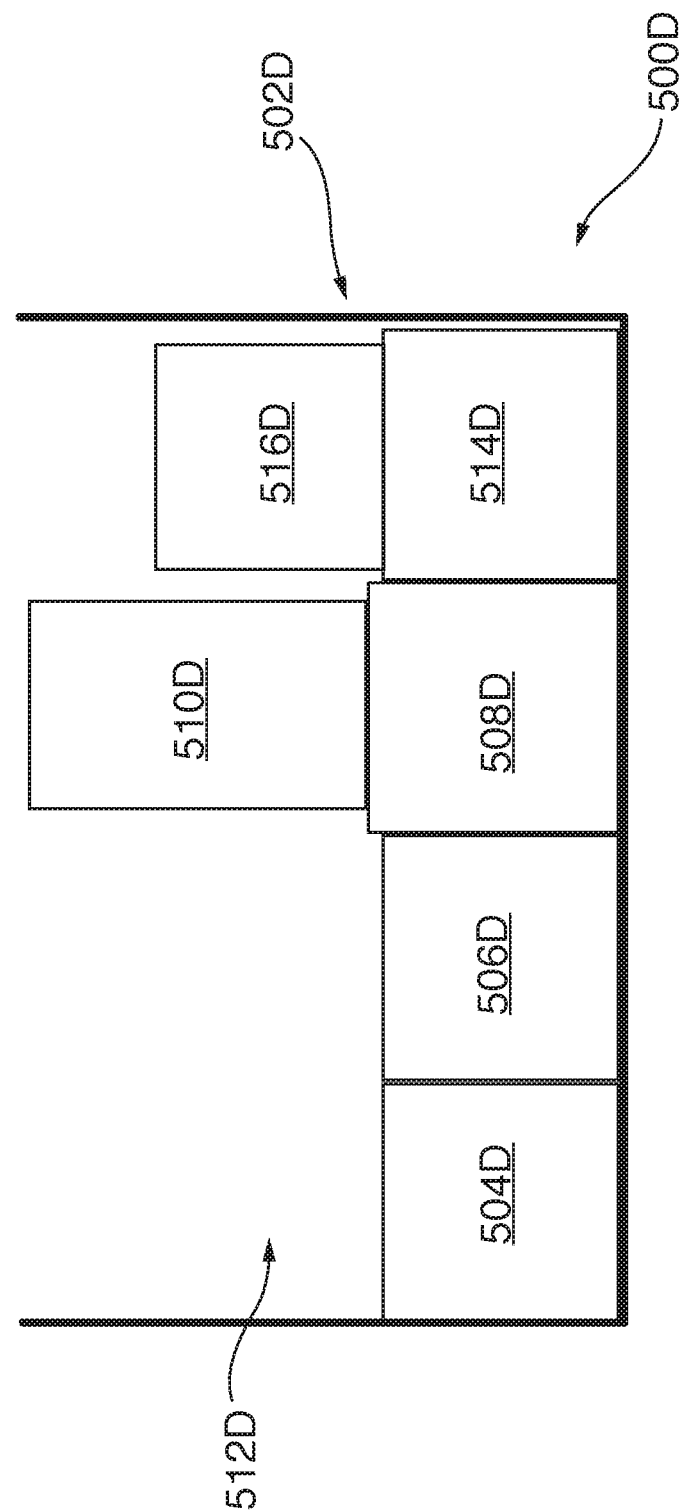
FIG. 5D is an illustrative cross-sectional view of a receptacle with items in still another arrangement accordance with various embodiments.

FIG. 5D. is an illustrative cross-sectional view 500D of receptacle 502D with items arranged in yet another arrangement in accordance with various embodiments. Receptacle 502D may be similar to first receptacle 108A of FIG. 1 and second receptacle 108B of FIG. 1 and the same description accordingly applies. In some embodiments, receptacle 502D may include first item 504D, second item 506D, third item 508D, fourth item 510D, fifth item 514D, and sixth item 516D. First item 504C, second item 506C, third item 508C, fourth item 510D, fifth item 514D, and sixth item 516D may be similar to first item 102A and second item 102B of FIG. 1 and the same description applies. As shown in FIG. 5D, first item 504D, second item 506D, and third item 508D form a first layer of items. The first layer of items may be efficiently oriented because there is no wasted space. Sixth item 516D was loaded on top of the first layer of items. Fourth item 510D was also loaded on top of the first layer of items. In some embodiments, the orientation of fourth item 510D may be inefficient. An imaging device may detect that fourth item 510D would be efficiently oriented if it was on its side. If fourth item 510D was re-oriented in such a way that fourth item 510D lays on its side, then fourth item 510D would occupy wasted space 512D.

Figure 5E:
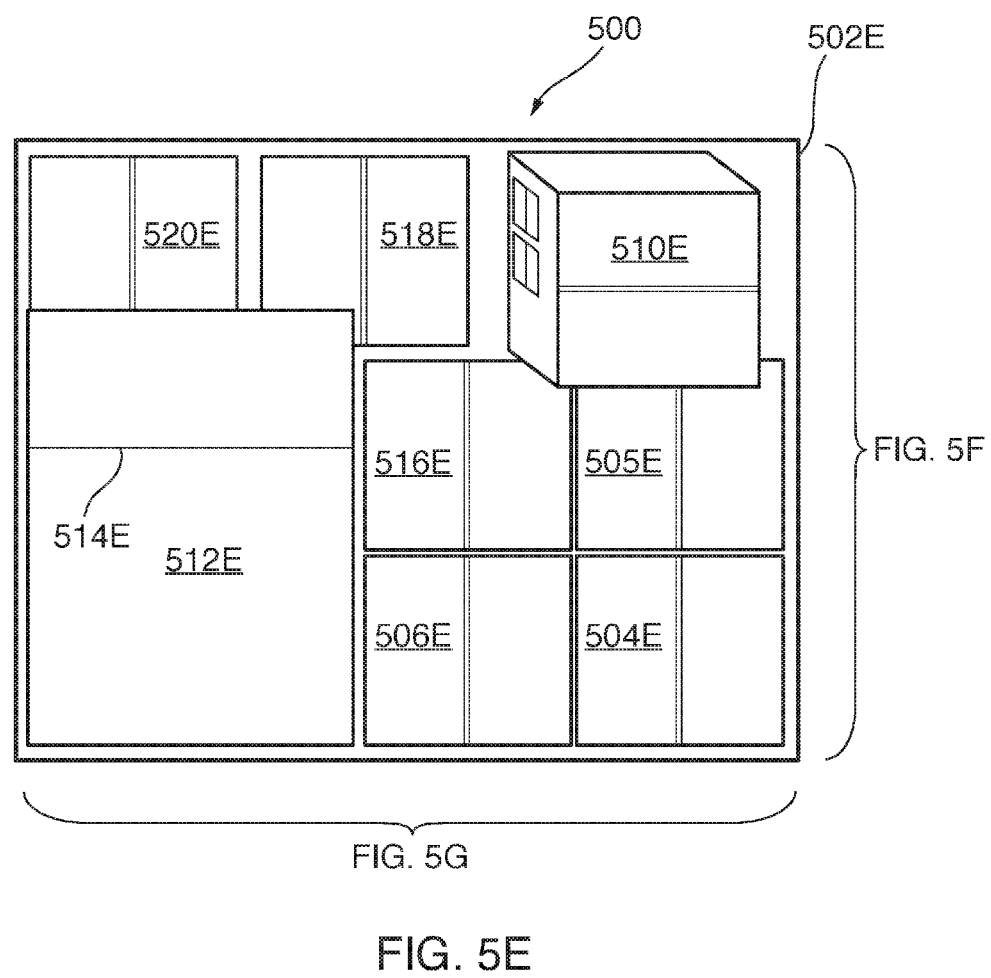
FIG. 5E is an illustrative top view of another receptacle with items in accordance with various embodiments.

FIG. 5E is an illustrative top view of receptacle 502E with items in accordance with various embodiments. Receptacle 502E may be similar to first receptacle 108A of FIG. 1 and second receptacle 108B of FIG. 1 and the same description accordingly applies. In some embodiments, receptacle 502E may include first item 504E, second item 506E, third item 508E, fourth item 510E, fifth item 512E, sixth item 516E, seventh item 518E, and eighth item 520E. First item 504E, second item 506E, third item 508E, fourth item 510E, fifth item 512E, sixth item 516E, seventh item 518E, and eighth item 520E may be similar to first item 102A and second item 102B of FIG. 1 and the same description applies. In some embodiments, first item 504E, second item 506E, third item 508E, sixth item 516E, seventh item 518E and eighth item 520E may form a first layer of items (for the purposes of the descriptions of FIGS. 5E-5G, hereinafter "first layer of items"). As shown in FIG. 5E, in some embodiments, fourth item 510E and fifth item 512E may be inefficiently oriented.

Fourth item 510E is not in line with the first layer of items. Therefore, in some embodiments, fourth item 510E may be inefficiently oriented. Furthermore, fourth item 510E is resting at an angle. In some embodiments, this may cause an imaging device to determine that fourth item 510E is inefficiently oriented. Fifth item 512E, as shown in FIG. 5E, is also resting at an angle. In some embodiments, an imaging device may detect edge 514E of fifth item 512E. The detection of edge 514E may lead an imaging device to determine that fifth item 512E is inefficiently oriented. The imaging device discussed in FIG. 5E may be similar to imaging device 200 of FIG. 2A and the same description applies.

Figure 5F:
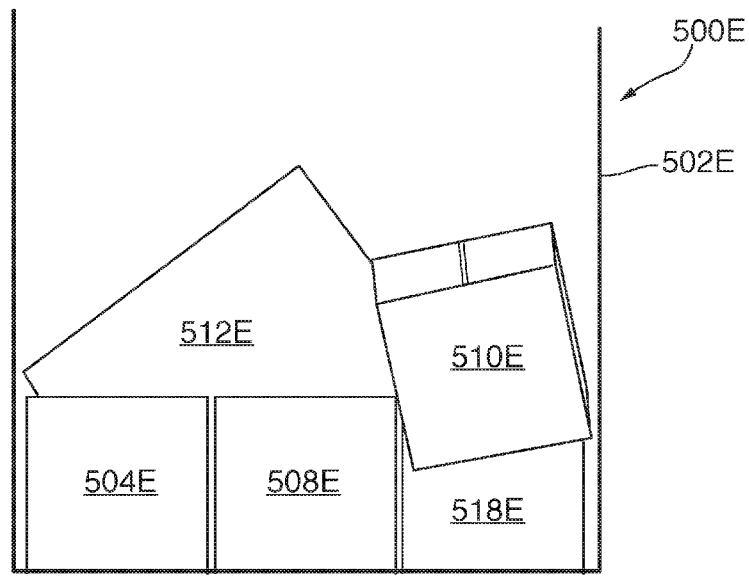
FIG. 5F is an illustrative cross-sectional side view of the receptacle with items in FIG. 5E in accordance with various embodiments.

FIG. 5F is an illustrative cross-sectional side view of receptacle 502E with items in FIG. 5E in accordance with various embodiments. As shown in FIG. 5F, fourth item 510E is at an angle and not aligned with the first layer of items. In some embodiments, this may cause an imaging device to determine that fourth item 510E is inefficiently oriented. Additionally, fifth item 512E is at an angle and not aligned with the first layer of items. In some embodiments, this may cause an imaging device to determine that fifth item 512E is inefficiently oriented. The imaging device discussed in FIG. 5F may be similar to imaging device 200 of FIG. 2A and the same description applies.

Figure 5G:
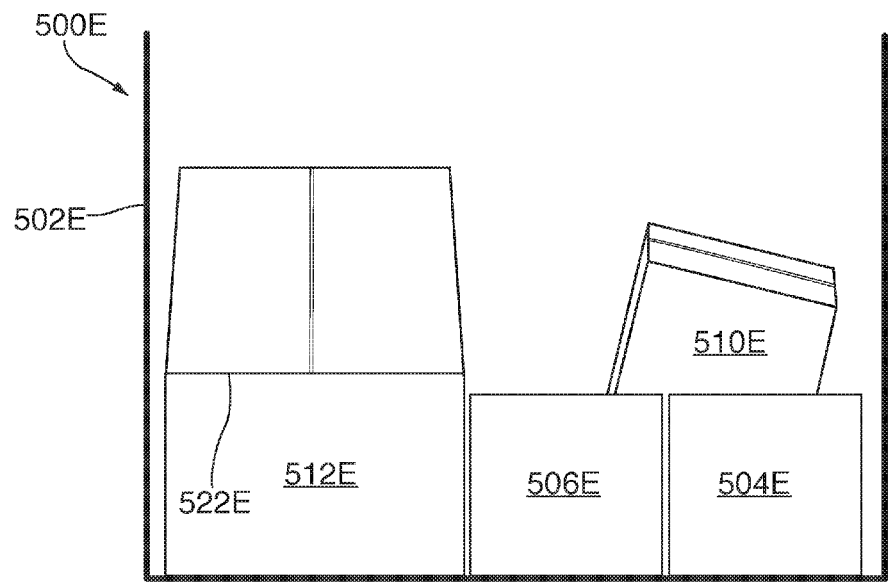
FIG. 5G is an illustrative cross-sectional front view of the receptacle with items in FIG. 5E in accordance with various embodiments.

FIG. 5G is an illustrative cross-sectional front view of receptacle 502E with items in FIG. 5E in accordance with various embodiments. As shown in FIG. 5G, fourth item 510E is at an angle and not aligned with the first layer of items. In some embodiments, this may cause an imaging device to determine that fourth item 510E is inefficiently oriented. Additionally, fifth item 512E is at an angle and not aligned with the first layer of items. In some embodiments, an imaging device may detect second edge 522E in order to determine that fifth item 512E is at an angle and/or not aligned with the first layer of items. In some embodiments, an imaging device, based on the detecting edge 514E and second edge 522E, may determine that fifth item 512E is inefficiently oriented. The imaging device discussed in FIG. 5G may be similar to imaging device 200 of FIG. 2A and the same description applies.

Figure 6:
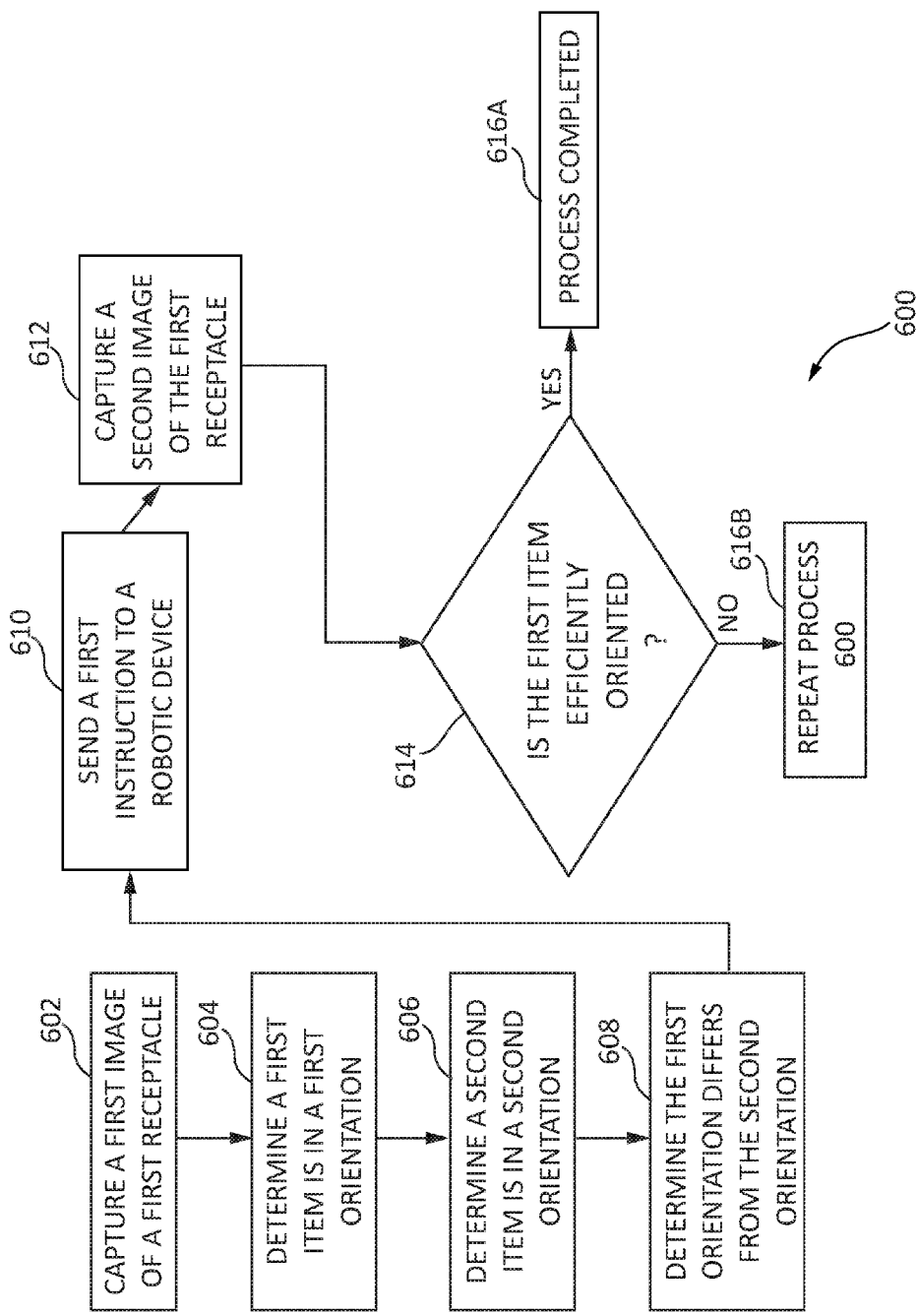
FIG. 6 is an illustrative flowchart of a process for optimizing an orientation of an item within a receptacle in accordance with various embodiments.

FIG. 6 is an illustrative flowchart of process 600 for optimizing the orientation of an item within a receptacle in accordance with various embodiments. Persons of ordinary skill in the art will recognize that, in some embodiments, steps within process 600 may be rearranged or omitted. Efficient and inefficient orientation, as used in process 600, may be similar to the descriptions in FIGS. 5A-5D and the same descriptions apply. Process 600 may begin at step 602. At step 602 a imaging device captures a first image of a first receptacle. The imaging device of process 600 and 600B may be similar to imaging device 200 of FIG. 2A and the same description applies. Furthermore, the first receptacle of process 600 may be similar to first receptacle 108A and second receptacle 108B of FIG. 1 and the same description applies. In some embodiments, the imaging device captures a first image of the interior of the first receptacle. The first receptacle, in some embodiments may contain a first item and at least a second item. The captured image, if the first receptacle has a first item and a second item, may include the first item and second item. In some embodiments, there may be a plurality of items in the first receptacle. For example, the first receptacle may contain thousands of items. In some embodiments, the image captured by the imaging device may be a video. In some embodiments, the image captured by the imaging device may be multiple images. In some embodiments, the image captured by the imaging device may be multiple images from multiple cameras of the imaging device.

Process 600 may continue at step 604. At step 604, the imaging device determines that a first item is in a first orientation. In some embodiments, the imaging device may determine the orientation of the first item using edge detection. Edge detection looks for distinct differences in light data from the captured image. The differences in light data help the imaging device find an edge of an item in the captured image. After finding an edge, the imaging device may look for data from nearby pixels to determine where similar differences in light exist in the captured image. The imaging device may continue to look for similar differences in light until an entire outline of the item has been found. This analysis, in some embodiments, may enable the imaging device to determine the first item is in a first orientation.

In some embodiments the imaging device may process the information from step 602 using clustering. Clustering allows the imaging device to develop an image using the data captured in the first image from step 602. When clustering, the imaging device may look for pixels that have identical data within the captured image. Once pixels with identical data have been searched for and/or found, the imaging device may then look for pixels that have the same data or nearly the same data as the identical data pixels. After all of the pixels are gathered and analyzed, the imaging device may determine the first item and the first item orientation within the captured image from step 602.

In some embodiments, the imaging device may use either edge detection or clustering or both to determine the first item's orientation. Persons of ordinary skill recognize that edge detection and clustering are two non-limiting examples of how the imaging device may determine the orientation of the first item. In some embodiments, the imaging device may use multiple cameras placed at different angles. This would allow the imaging device to get a three dimensional image of the first item, and therefore, the orientation. In another embodiment, the imaging device may also use laser scanners instead of, or in combination with a camera.

In some embodiments, the first orientation is stored on memory of the imaging device. Memory, as discussed herein, may be similar to memory 206 of FIG. 2A and the same description applies.

Process 600 may continue at step 606. At step 606, the imaging device determines a second item is in a second orientation. In some embodiments, the imaging device may determine the orientation of the second item using edge detection. Edge detection looks for distinct differences in light data from the captured image. The differences in light data help the imaging device find an edge of an item in the captured image. After finding an edge, the imaging device may look for data from nearby pixels to determine where similar differences in light exist in the captured image. The imaging device may continue to look for similar differences in light until an entire outline of the item has been found. This analysis, in some embodiments, may enable the imaging device to determine the second item is in a second orientation.

In some embodiments the imaging device may determine the orientation of the second item using clustering. Clustering allows the imaging device to develop an image using the data captured in the first image from step 602. When clustering, the imaging device may look for pixels that have identical data within the captured image. Once pixels with identical data have been searched for and/or found, the imaging device may then look for pixels that have the same data or nearly the same data as the identical data pixels. After all of the pixels are gathered and analyzed, the imaging device may determine the second item and the second item orientation within the captured image from step 602.

In some embodiments, the imaging device may use either edge detection or clustering or both to determine the second item's orientation. Persons of ordinary skill recognize that edge detection and clustering are two non-limiting examples of how the imaging device may determine the orientation of the first item. In some embodiments, the imaging device may use multiple cameras placed at different angles. This would allow the imaging device to get a three dimensional image of the second item, and therefore, the orientation. In another embodiment, the imaging device may also use laser scanners instead of, or in combination with a camera.

In some embodiments, the second orientation is stored on memory of the imaging device. Memory, as discussed herein, may be similar to memory 206 of FIG. 2A and the same description applies.

Process 600 may continue at step 608. At step 608, the imaging device determines the first orientation differs from the second orientation. After determining the orientation of the first item and the orientation of the second item, the imaging device, in some embodiments, compares the orientation of the first item and the orientation of the second item. The orientations may be compared by accessing the stored orientations on the memory of the imaging device. If the first orientation and the second orientation differ, the imaging device may determine that one of the items must be moved. In some embodiments, the imaging device may use the second item as a baseline for what an efficient packing method is. If there are more than two items within the receptacle, the imaging device may use multiple packages that have the same orientation as the baseline for what an efficient orientation is. In some embodiments, the imaging device may determine which of the two orientations is efficient. This may occur by determining which item is on its edge or wasting space within the receptacle.

In some embodiments, if both items are oriented in the same manner, the imaging device may determine that both orientations are efficient and may not instruct the robotic device to do anything. In some embodiments, if both items are oriented in the same manner, the imaging device may determine that both orientations are inefficient and instruct the robotic device to move both items.

In some embodiments, the imaging device may also determine the location of the first item. The location of the first item may include a depth of the first item. In some embodiments, the location of the first item may also include X and Y distances from sides of the first receptacle. For example, the location may include a first distance from a first side of the first receptacle and a second distance from a second side of the first receptacle.

In some embodiments, the imaging device may also determine the location of the second item. The location of the second item may include a depth of the second item. In some embodiments, the location of the second item may also include X and Y distances from sides of the first receptacle. For example, the location may include a first distance from a first side of the first receptacle and a second distance from a second side of the first receptacle.

In some embodiments, the imaging device may find the difference in distances between the first item and the second item. This may occur by determining the differences in the depth and X and Y distances found for the first item and the second item. The difference in distances may allow the imaging device to give the robotic device specific instructions as to where the first item or second item should be moved to.

Process 600 may continue at step 610. At step 610, the imaging device sends a first instruction to a robotic device. The first instruction sent to the robotic device, in some embodiments, may instruct the robotic device to move the first item from the first orientation to a third orientation. The third orientation, in some embodiments, differs from the first orientation. Once receiving this instruction, the robotic device will lower into the first receptacle and move the first item. In some embodiments, the robotic device may simply knock the first item over, moving the first item into a different location and orientation.

In some embodiments, the instructions may include the location of the first item. The location, as discussed in step 608, may give an accurate location to the robotic device so the robotic device can quickly and accurately find and move the first item. In some embodiments, the instructions may include the location of the second item. This would allow the robotic device to know where the first item may be moved to. In some embodiments, the instructions may include the difference in location between the first item and the second item. If the robotic device receives the difference in location, the robotic device may lift the first item and place it in a more efficient location near the second item.

Process 600 may continue at step 612. At step 612, the imaging device captures a second image of the first receptacle. Once the robotic device has moved the first item, the imaging device may capture a second image of the first receptacle. This step may be similar to step 602 of process 600 and the same description applies.

Process 600 may continue at step 614. At step 614, the imaging device determines whether the first item is efficiently oriented. In some embodiments, the imaging device may determine the orientation of the first item using edge detection. Edge detection looks for distinct differences in light data from the captured image. The differences in light data help the imaging device find an edge of an item in the captured image. After finding an edge, the imaging device may look for data from nearby pixels to determine where similar differences in light exist in the captured image. The imaging device may continue to look for similar differences in light until an entire outline of the item has been found. This analysis, in some embodiments, may enable the imaging device to determine the first item is in a third orientation.

In some embodiments the imaging device may process the information from step 612 using clustering to determine the orientation of the first item. Clustering allows the imaging device to develop an image using the data captured in the first image from step 612. When clustering, the imaging device may look for pixels that have identical data within the captured image. Once pixels with identical data have been searched for and/or found, the imaging device may then look for pixels that have the same data or nearly the same data as the identical data pixels. After all of the pixels are gathered and analyzed, the imaging device may determine the first item and the first item orientation within the captured image from step 612.

In some embodiments, the imaging device may use either edge detection or clustering or both to determine the first item's orientation. Persons of ordinary skill recognize that edge detection and clustering are two non-limiting examples of how the imaging device may determine the orientation of the first item. In some embodiments, the imaging device may use multiple cameras placed at different angles. This would allow the imaging device to get a three dimensional image of the first item, and therefore, the orientation. In another embodiment, the imaging device may also use laser scanners instead of, or in combination with a camera.

In some embodiments, the third orientation is stored on memory of the imaging device. Memory, as discussed herein, may be similar to memory 206 of FIG. 2A and the same description applies.

If the first item is efficiently oriented, process 600 completes at step 616A. At step 616A, the imaging device determines the first item is efficiently oriented. Even though both the first item is efficiently oriented, the process, in some embodiments, may still be repeated. This is because, in some embodiments, more items may be loaded into the first receptacle. Process 600 may continue until the first receptacle is full and ready to be shipped.

If the first item is not efficiently oriented, at step 616B, process 600 starts over.

Figure 7:
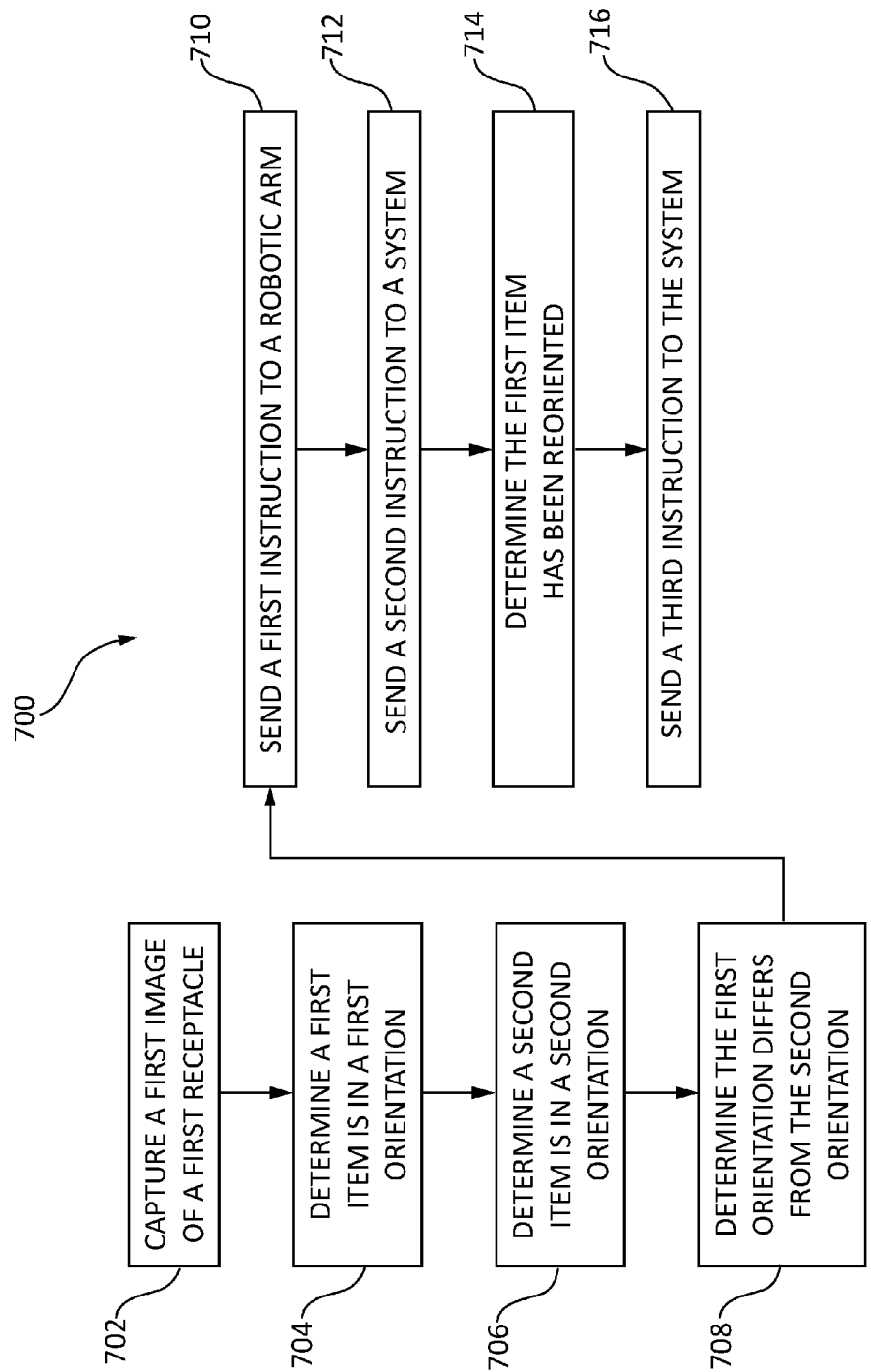
FIG. 7 is an illustrative flowchart of another process for optimizing the orientation of an item within a receptacle in accordance with various embodiments.

FIG. 7 is an illustrative flowchart of process 700 for optimizing the orientation of an item within a receptacle in accordance with various embodiments. Persons of ordinary skill in the art will recognize that, in some embodiments, some steps within process 700 may be rearranged or omitted. Efficient and inefficient orientation, as used in process 700, may be similar to the descriptions above in connection with FIGS. 5A-5D and the same descriptions apply. Process 700 may begin at step 702. At step 702 a imaging device captures a first image of a first receptacle. The imaging device of process 700 may be similar to imaging device 200 of FIG. 2A and the same description applies. Furthermore, the first receptacle of process 700 may be similar to first receptacle 108A and second receptacle 108B of FIG. 1 and the same description applies. In some embodiments, the imaging device captures a first image of the interior of the first receptacle. The first receptacle, in some embodiments may contain a first item and at least a second item. The captured image, if the first receptacle has a first item and a second item, may include the first item and second item. In some embodiments, there may be a plurality of items in the first receptacle. For example, the first receptacle may contain thousands of items. In some embodiments, the image captured by the imaging device may be a video. In some embodiments, the image captured by the imaging device may be multiple images. In some embodiments, the image captured by the imaging device may be multiple images from multiple cameras of the imaging device.

Process 700 may continue at step 704. At step 704, the imaging device determines that a first item is in a first orientation. In some embodiments, the imaging device may determine the orientation of the first item using edge detection. Edge detection looks for distinct differences in light data from the captured image. The differences in light data help the imaging device find an edge of an item in the captured image. After finding an edge, the imaging device may look for data from nearby pixels to determine where similar differences in light exist in the captured image. The imaging device may continue to look for similar differences in light until an entire outline of the item has been found. This analysis, in some embodiments, may enable the imaging device to determine the first item is in a first orientation.

In some embodiments the imaging device may process the information from step 702 using clustering. Clustering allows the imaging device to develop an image using the data captured in the first image from step 702. When clustering, the imaging device may look for pixels that have identical data within the captured image. Once pixels with identical data have been searched for and/or found, the imaging device may then look for pixels that have the same data or nearly the same data as the identical data pixels. After all of the pixels are gathered and analyzed, the imaging device may determine the first item and the first item orientation within the captured image from step 702.

In some embodiments, the imaging device may use either edge detection or clustering or both to determine the first item's orientation. Persons of ordinary skill recognize that edge detection and clustering are two non-limiting examples of how the imaging device may determine the orientation of the first item. In some embodiments, the imaging device may use multiple cameras placed at different angles. This would allow the imaging device to get a three dimensional image of the first item, and therefore, the orientation. In another embodiment, the imaging device may also use laser scanners instead of, or in combination with a camera.

In some embodiments, the first orientation is stored on memory of the imaging device. Memory, as discussed herein, may be similar to memory 206 of FIG. 2A and the same description applies.

Process 700 may continue at step 706. At step 706, the imaging device determines a second item is in a second orientation. In some embodiments, the imaging device may determine the orientation of the second item using edge detection. Edge detection looks for distinct differences in light data from the captured image. The differences in light data help the imaging device find an edge of an item in the captured image. After finding an edge, the imaging device may look for data from nearby pixels to determine where similar differences in light exist in the captured image. The imaging device may continue to look for similar differences in light until an entire outline of the item has been found. This analysis, in some embodiments, may enable the imaging device to determine the second item is in a second orientation.

In some embodiments the imaging device may determine the orientation of the second item using clustering. Clustering allows the imaging device to develop an image using the data captured in the first image from step 702. When clustering, the imaging device may look for pixels that have identical data within the captured image. Once pixels with identical data have been searched for and/or found, the imaging device may then look for pixels that have the same data or nearly the same data as the identical data pixels. After all of the pixels are gathered and analyzed, the imaging device may determine the second item and the second item orientation within the captured image from step 702.

In some embodiments, the imaging device may use either edge detection or clustering or both to determine the second item's orientation. Persons of ordinary skill recognize that edge detection and clustering are two non-limiting examples of how the imaging device may determine the orientation of the first item. In some embodiments, the imaging device may use multiple cameras placed at different angles. This would allow the imaging device to get a three dimensional image of the second item, and therefore, the orientation. In another embodiment, the imaging device may also use laser scanners instead of, or in combination with a camera.

In some embodiments, the second orientation is stored on memory of the imaging device. Memory, as discussed herein, may be similar to memory 206 of FIG. 2A and the same description applies.

Process 700 may continue at step 708. At step 708, the imaging device determines the first orientation differs from the second orientation. After determining the orientation of the first item and the orientation of the second item, the imaging device, in some embodiments, compares the orientation of the first item and the orientation of the second item.

The orientations may be compared by comparing the stored orientations on the memory of the imaging device. If the first orientation and the second orientation differ, the imaging device may determine that one of the items must be moved. In some embodiments, the imaging device may use the second item as a baseline for what an efficient packing method is. If there are more than two items within the receptacle, the imaging device may use multiple packages that have the same orientation as the baseline for what an efficient orientation is. In some embodiments, the imaging device may determine which of the two orientations is efficient. This may occur by determining which item is on its edge or wasting space within the receptacle.

In some embodiments, if both items are oriented in the same manner, the imaging device may determine that both orientations are efficient and may not instruct the robotic device to do anything. In some embodiments, if both items are oriented in the same manner, the imaging device may determine that both orientations are inefficient and instruct the robotic device to move both items.

In some embodiments, the imaging device may also determine the location of the first item. The location of the first item may include a depth of the first item. In some embodiments, the location of the first item may also include X and Y distances from sides of the first receptacle. For example, the location may include a first distance from a first side of the first receptacle and a second distance from a second side of the first receptacle.

In some embodiments, the imaging device may also determine the location of the second item. The location of the second item may include a depth of the second item. In some embodiments, the location of the second item may also include X and Y distances from sides of the first receptacle. For example, the location may include a first distance from a first side of the first receptacle and a second distance from a second side of the first receptacle.

In some embodiments, the imaging device may find the difference in distances between the first item and the second item. This may occur by determining the differences in the depth and X and Y distances found for the first item and the second item. The difference in distances may allow the imaging device to give the robotic device specific instructions as to where the first item or second item should be moved to.

Process 700 may continue at step 710. At step 710, the imaging device sends a first instruction to a robotic device. The first instruction sent to the robotic device, in some embodiments, may instruct the robotic device to move the first item from the first orientation to a third orientation. The third orientation, in some embodiments, differs from the first orientation. Once receiving this instruction, the robotic device will lower into the first receptacle and move the first item. In some embodiments, the robotic device may simply knock the first item over, moving the first item into a different location and orientation.

In some embodiments, the instructions may include the location of the first item. The location, as discussed in step 708, may give an accurate location to the robotic device so the robotic device can quickly and accurately find and move the first item. In some embodiments, the instructions may include the location of the second item. This would allow the robotic device to know where the first item may be moved to. In some embodiments, the instructions may include the difference in location between the first item and the second item. If the robotic device receives the difference in location, the robotic device may lift the first item and place it in a more efficient location near the second item.

Process 700 may continue at step 712. At step 712, the imaging device sends a second instruction to a system. In some embodiments, items are being loaded into the first receptacle continuously. In order to allow the robotic device time to move the first item into an efficient orientation, the imaging device may send an instruction to the system to prevent more items from being sent to the first receptacle. The system may refer to any system that controls the flow of items into the first receptacle. In some embodiments, the system may be a moving track. The system, in some embodiments, may be similar to moving track 104 of FIG. 1 and the same description applies. Once the system receives the instruction, the system may stop items from being sent to the first receptacle. For example, a wall might swing closed or raise in order to prevent items from being sent to the first receptacle. The wall discussed herein may be similar to wall 116 of FIG. 1 and the same description applies.

Process 700 may continue at step 714. At step 714, the imaging device determines the first item has been re-oriented. In some embodiments, the robotic device may send a notification to the imaging device. This notification may alert the imaging device that the robotic arm is finished re-orienting the first item. In some embodiments, this may be accomplished by capturing another image. In this embodiment, the imaging device would process the image in a similar manner to step 704 and determine that the first item has been re-oriented.

Process 700 may continue at step 716. At step 716, the imaging device sends a third instruction to the system. Once the imaging device has determined that that the first item has been re-oriented, the imaging device may determine that the first receptacle can receive more items. To receive more items, the imaging device may send an instruction to the system directing the system to open the passage way to the first receptacle. The system may refer to any system that controls the flow of items into the first receptacle. In some embodiments, the system may be a moving track. The system, in some embodiments, may be similar to moving track 104 of FIG. 1 and the same description applies. Once the system receives the instruction, the system may allow items to be sent to the first receptacle. For example, a wall might swing open or lower in order to allow items to be sent to the first receptacle. The wall discussed herein may be similar to wall 116 of FIG. 1 and the same description applies.

Figure 8:
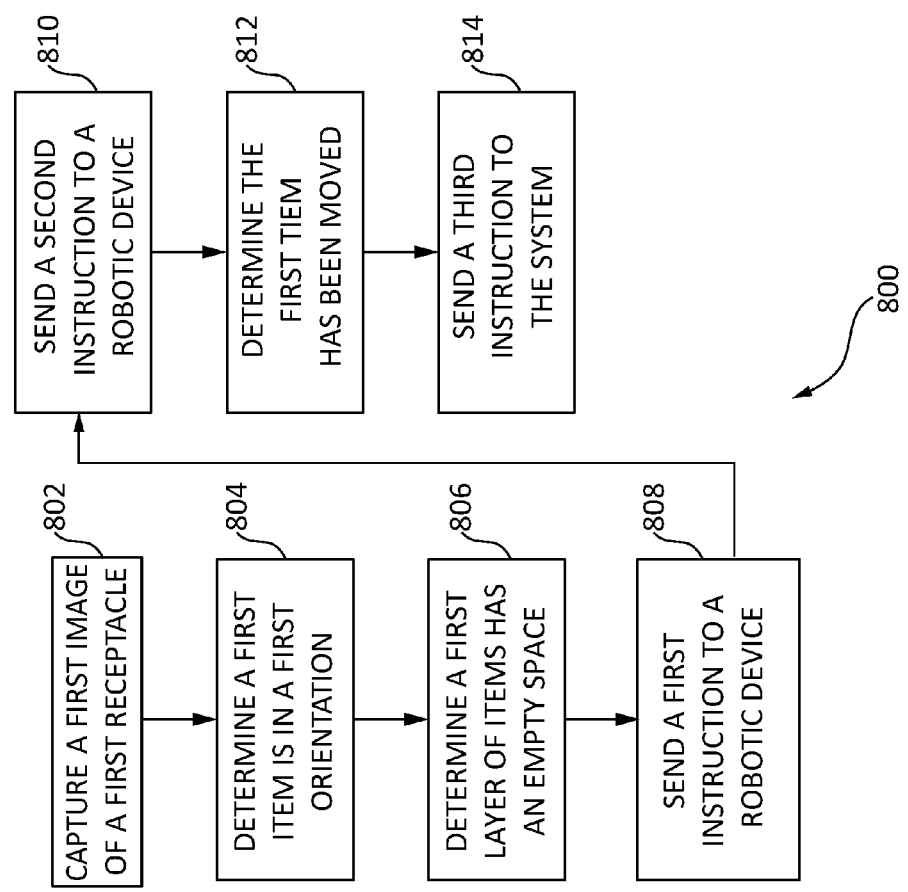
FIG. 8 is an illustrative flowchart of another process for optimizing the orientation of items within receptacles in accordance with various embodiments.

FIG. 8 is an illustrative flowchart of a process for optimizing the orientation of items within receptacles in accordance with various embodiments. Persons of ordinary skill in the art will recognize that, in some embodiments, steps within process 800 may be rearranged or omitted. Efficient and inefficient orientation, as used in process 800, may be similar to the descriptions above made in connection with FIGS. 5A-5D and the same descriptions apply. Process 800 may begin at step 802. At step 802 a imaging device captures a first image of a first receptacle. The imaging device of process 800 may be similar to imaging device 200 of FIG. 2A and the same description applies. Furthermore, the first receptacle of process 800 may be similar to first receptacle 108A and second receptacle 108B of FIG. 1 and the same description applies. In some embodiments, the imaging device captures a first image of the interior of the first receptacle. The first receptacle, in some embodiments may contain a first item and at least a second item. The captured image, if the first receptacle has a first item and a second item, may include the first item and second item. In some embodiments, there may be a plurality of items in the first receptacle. For example, the first receptacle may contain thousands of items. In some embodiments, the image captured by the imaging device may be a video. In some embodiments, the image captured by the imaging device may be multiple images. In some embodiments, the image captured by the imaging device may be multiple images from multiple cameras of the imaging device.

Process 800 may continue at step 804. At step 804, the imaging device determines that a first item is in a first orientation. In some embodiments, the imaging device may determine the orientation of the first item using edge detection. Edge detection looks for distinct differences in light data from the captured image. The differences in light data help the imaging device find an edge of an item in the captured image. After finding an edge, the imaging device may look for data from nearby pixels to determine where similar differences in light exist in the captured image. The imaging device may continue to look for similar differences in light until an entire outline of the item has been found. This analysis, in some embodiments, may enable the imaging device to determine the first item is in a first orientation.

In some embodiments the imaging device may process the information from step 802 using clustering. Clustering allows the imaging device to develop an image using the data captured in the first image from step 802. When clustering, the imaging device may look for pixels that have identical data within the captured image. Once pixels with identical data have been searched for and/or found, the imaging device may then look for pixels that have the same data or nearly the same data as the identical data pixels. After all of the pixels are gathered and analyzed, the imaging device may determine the first item and the first item orientation within the captured image from step 802.

In some embodiments, the imaging device may use either edge detection or clustering or both to determine the first item's orientation. Persons of ordinary skill recognize that edge detection and clustering are two non-limiting examples of how the imaging device may determine the orientation of the first item. In some embodiments, the imaging device may use multiple cameras placed at different angles. This would allow the imaging device to get a three dimensional image of the first item, and therefore, the orientation. In another embodiment, the imaging device may also use laser scanners instead of, or in combination with a camera.

In some embodiments, the first orientation is stored on memory of the imaging device. Memory, as discussed herein, may be similar to memory 206 of FIG. 2A and the same description applies.

Process 800 may continue at step 806. At step 806, the imaging device determines a first layer of items has an empty space. In some embodiments, the imaging device may find an empty space in the first layer of items using edge detection. Edge detection looks for distinct differences in light data from the captured image. The differences in light data help the imaging device find an edge of an item in the captured image. After finding an edge, the imaging device may look for data from nearby pixels to determine where similar differences in light exist in the captured image. The imaging device may continue to look for similar differences in light until an entire outline of the item has been found. This analysis, in some embodiments, may enable the imaging device to determine the first layer of items has an empty space.

In some embodiments the imaging device may find an empty space in the first layer of items using clustering. Clustering allows the imaging device to develop an image using the data captured in the first image from step 802. When clustering, the imaging device may look for pixels that have identical data within the captured image. Once pixels with identical data have been searched for and/or found, the imaging device may then look for pixels that have the same data or nearly the same data as the identical data pixels. After all of the pixels are gathered and analyzed, the imaging device may find an empty space within the first layer of items from image information captured from step 802.

In some embodiments, the imaging device may determine that the empty space is large enough for the first item to fit in it. In these embodiments, the imaging device would determine a size of the first item. In some embodiments, the first item's size may include length, width and height. In some embodiments, the first item's size may include length and width. In some embodiments, the first item's size may include length and height. In some embodiments, the first item's size may include width and height. The imaging device may then determine a size of the empty space. In some embodiments, the empty space's size may include length, width and height. In some embodiments, the empty space's size may include length and width. In some embodiments, the empty space's size may include length and height. In some embodiments, the empty space's size may include width and height. The imaging device may then compare the size of the first item and the size of the empty space. If the first item would fit in the empty space (i.e. if the size of the first item is less than or equal to the size of the empty space), the imaging device may instruct a robotic device to move the first item to the empty space. However, in some embodiments, if the imaging device determines that the empty space is not large enough to accommodate the first item (i.e. the size of the first item is greater than the size of the empty space), the imaging device may not instruct the robotic device to move the first item.

In some embodiments, the imaging device may use either edge detection or clustering or both to determine the second item's orientation. Persons of ordinary skill recognize that edge detection and clustering are two non-limiting examples of how the imaging device may determine the orientation of the first item. In some embodiments, the imaging device may use multiple cameras placed at different angles. This would allow the imaging device to get a three dimensional image of the second item, and therefore, the orientation. In another embodiment, the imaging device may also use laser scanners instead of, or in combination with a camera.

In some embodiments, the second orientation is stored on memory of the imaging device. Memory, as discussed herein, may be similar to memory 206 of FIG. 2A and the same description applies.

In some embodiments, the imaging device may also determine the location of the first item. The location of the first item may include a depth of the first item. In some embodiments, the location of the first item may also include X and Y distances from sides of the first receptacle. For example, the location may include a first distance from a first side of the first receptacle and a second distance from a second side of the first receptacle.

In some embodiments, the imaging device may also determine the location of the empty space. The location of the empty space may include a depth of the second item. In some embodiments, the location of the empty space may also include X and Y distances from sides of the first receptacle. For example, the location may include a first distance from a first side of the first receptacle and a second distance from a second side of the first receptacle.

In some embodiments, the imaging device may find the difference in location between the first item and the empty space. This may occur by determining the differences in the depth and X and Y distances found for the first item and the empty space. The difference in distances may allow the imaging device to give the robotic device specific instructions as to where the first item should be moved to.

Process 800 may continue at step 808. At step 808, the imaging device sends a first instruction to a robotic device. The first instruction sent to the robotic device, in some embodiments, may instruct the robotic device to move the first item. Once receiving this instruction, the robotic device will lower into the first receptacle and move the first item. In some embodiments, the robotic device may simply knock the first item over, moving the first item into a different location and orientation.

In some embodiments, the instructions may include the location of the first item. The location, as discussed in step 808, may give an accurate location to the robotic device so the robotic device can quickly and accurately find and move the first item. In some embodiments, the instructions may include the location of the empty space. This would allow the robotic device to know where the first item may be moved to. In some embodiments, the instructions may include the difference in location between the first item and the empty space. If the robotic device receives the difference in location, the robotic device may lift the first item and place it in the empty space.

Process 800 may continue at step 810. At step 810, the imaging device sends a second instruction to a system. In some embodiments, items are being loaded into the first receptacle continuously. In order to allow the robotic device time to move the first item into an efficient orientation, the imaging device may send an instruction to the system to prevent more items from being sent to the first receptacle. The system may refer to any system that controls the flow of items into the first receptacle. In some embodiments, the system may be a moving track. The system, in some embodiments, may be similar to moving track 104 of FIG. 1 and the same description applies. Once the system receives the instruction, the system may stop items from being sent to the first receptacle. For example, a wall might swing closed or raise in order to prevent items from being sent to the first receptacle. The wall discussed herein may be similar to wall 116 of FIG. 1 and the same description applies. This may be similar to step 712 of process 700 and the same description applies.

Process 800 may continue at step 812. At step 812 the imaging device determines the first item has been moved. In some embodiments, the robotic device may send a notification to the imaging device. This notification may alert the imaging device that the robotic arm is finished moving the first item. In some embodiments, this may be accomplished by capturing another image. In this embodiment, the imaging device would process the image in a similar manner to step 804 and determine that the first item has been moved. Step 812 may be similar to step 714 of process 700 and the same description applies.

Process 800 may continue at step 814. At step 814, the imaging device sends a third instruction to the system. Once the imaging device has determined that the first item has been moved, the imaging device may determine that the first receptacle can receive more items. To receive more items, the imaging device may send an instruction to the system directing the system to open the passage way to the first receptacle. The system may refer to any system that controls the flow of items into the first receptacle. In some embodiments, the system may be a moving track. The system, in some embodiments, may be similar to moving track 104 of FIG. 1 and the same description applies. Once the system receives the instruction, the system may allow items to be sent to the first receptacle. For example, a wall might swing open or lower in order to allow items to be sent to the first receptacle. The wall discussed herein may be similar to wall 116 of FIG. 1 and the same description applies.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A system, comprising:
  a first station comprising:
    a first item loader; and
    a first receptacle configured to receive items supplied by the first item loader;
  a first imaging device comprising a first camera configured to capture at least one image of a first plurality of items loaded into the first receptacle;
  a processor operable to:
    receive image information based on the at least one image from the first imaging device; and
    process the image information to determine that at least one item of the first plurality of items has an undesired orientation within the first receptacle;
  communications circuitry operable to send a first instruction in response to detecting the undesired orientation, the first instruction indicating a direction to change the orientation of the at least one item of the first plurality of items; and
  a first robotic device operable to:
    receive the first instruction; and
    change the orientation of the at least one item of the first plurality of items to a different orientation when loaded in the first receptacle in response to the received first instruction.

2. The system of claim 1, further comprising:
  a second station comprising:
    a second item loader;
    a second receptacle configured to receive items supplied by the second item loader;
    a second imaging device comprising a second camera configured to capture at least one image of the second receptacle as a second plurality of items are being loaded into the second receptacle, the second imaging device being aligned with the second station in order to detect when the second plurality of items are loaded in an undesired orientation; and
  wherein the processor is further operable to:
    receive the image information from the second imaging device; and
    process the image information received from the second imaging device to detect when the second plurality of items are loaded in the undesired orientation within the second receptacle.

3. The system of claim 1, wherein the first robotic device comprises:
  a second camera operable to assist in determining a location of at least one of the first robotic device and the first plurality of items; and
  an end effector.

4. The system of claim 1, wherein the processor is further operable to:
  determine a first location of the at least one item of the first plurality of items;
  determine a second location, such that the second location is a space for the at least one item of the first plurality of items; and
  determine a difference between the first location and the second location.

5. The system of claim 4, wherein the communications circuitry is further operable to:
  send, to the first robotic device, at least one of:
    the first location;
    the second location; and
    the difference between the first location and the second location.

6. The system of claim 1, wherein the communications circuitry is further operable to:
  send second instructions, such that the second instructions prevent additional items from being loaded by the first item loader.

7. The system of claim 1, wherein the undesired orientation comprises at least one of:
  the at least one item of the first plurality of items is positioned in a manner that differs from a second item of the first plurality of items;
  the at least one item of the first plurality of items is resting at an angle in relation to the second item of the first plurality of items; and
  the at least one item of the first plurality of items is positioned such that wasted space exists in the first receptacle.

8. A method comprising:
  capturing, using an imaging device, a first image of a first receptacle, the first receptacle comprising:
    a first item; and
    at least a second item;
  receiving the first image at a processor;
  determining, using the processor, based on the first image, that the first item is in a first orientation;
  determining, using the processor, based on the first image, that the second item is in a second orientation that differs from the first orientation; and
  sending, using the processor, a first instruction to a robotic device such that the robotic device causes the first item to be re-oriented to a different orientation when loaded in the first receptacle.

9. A method comprising:
  capturing, using an imaging device, a first image of a first receptacle, the first receptacle comprising:
  a first item; and
  at least a second item;
  receiving the first image at a processor;
  determining, using the processor, based on the first image, that the first item is in a first orientation;
  determining, using the processor, based on the first image, that the second item is in a second orientation that differs from the first orientation; and
  sending, using the processor, a first instruction to a robotic device such that the robotic device causes the first item to be re-oriented to a different orientation when loaded in the first receptacle;
  capturing, using the imaging device, in response to sending the first instruction, a second image of the first receptacle; and
  determining, using the processor, based on the second image, that the first item is in a desired orientation.

10. A method comprising:
  capturing, using an imaging device, a first image of a first receptacle, the first receptacle comprising:
    a first item; and
    at least a second item;
  receiving the first image at a processor;
  determining, using the processor, based on the first image, that the first item is in a first orientation;
  determining, using the processor, based on the first image, that the second item is in a second orientation that differs from the first orientation;
  sending, using the processor, a first instruction to a robotic device such that the robotic device causes the first item to be re-oriented;
  sending, using the processor, prior to sending the first instruction, a second instruction to a system, the second instruction causing the system to prevent additional items from being sent to the first receptacle;
  determining, using the processor, that the robotic device has re-oriented the first item; and
  sending, using the processor, after sending the first instruction, a third instruction to the system, the third instruction causing the system to allow the additional items to be sent to the first receptacle.

11. A method comprising:
  capturing, using an imaging device, a first image of a first receptacle, the first receptacle comprising:
    a first item; and
    at least a second item;
  receiving the first image at a processor;
  determining, using the processor, based on the first image, that the first item is in a first orientation;
  determining, using the processor, based on the first image, that the second item is in a second orientation that differs from the first orientation;
  sending, using the processor, a first instruction to a robotic device such that the robotic device causes the first item to be re-oriented;
  capturing, using the imaging device, a second image of the first receptacle;
  determining, using the processor, based on the second image, that the first item is in a different orientation than the second orientation; and
  sending, using the processor, a second instruction to the robotic device such that the robotic device causes the first item to be re-oriented.

12. A method comprising:
  capturing, using an imaging device, a first image of a first receptacle, the first receptacle comprising:
    a first item; and
    at least a second item;
  receiving the first image at a processor;
  determining, using the processor, based on the first image, that the first item is in a first orientation;
  determining, using the processor, based on the first image, that the second item is in a second orientation that differs from the first orientation;
  sending, using the processor, a first instruction to a robotic device such that the robotic device causes the first item to be re-oriented; and
  determining, using the processor that the first item is located at a first location within the first receptacle such that the first instruction comprises the first location, the first location comprising at least:
    a depth of the first item;
    a first distance from a first side of the first receptacle; and a second distance from a second side of the first receptacle.

13. The method of claim 12, further comprising:
determining using the processor, prior to sending the first instruction, that the second item is located at a second location, such that the first instruction further comprises the second location.

14. The method of claim 13, further comprising:
determining, using the processor, prior to sending the first instruction, a difference between the first location and the second location, such that the first instruction further comprises the difference.

15. A method comprising:
capturing, using an imaging device, a first image of a first receptacle, the first receptacle comprising:
a first item; and
a first layer of items;
transmitting the first image to a processor;
determining, using the processor, based on the first image, that the first item is on top of the first layer of items;
determining, using the processor, based on the first image, that the first layer of items comprises empty space; and
sending, using the processor a first instruction to a robotic device such that the robotic device causes the first item to be moved.

16. The method of claim 15, further comprising:
capturing, using the imaging device, in response to sending the first instruction, a second image of the first receptacle; and
determining, using the processor, based on the second image, that at least a portion of the first item is in the empty space.

17. The method of claim 15, further comprising:
sending, using the processor, prior to sending the first instruction, a second instruction to a system, the second instruction causing the system to prevent additional items from being sent to the first receptacle;
determining, using the processor, that the robotic device has moved the first item; and
sending, using the processor, after sending the first instruction, a third instruction to the system, the third instruction causing the system to allow the additional items to be sent to the first receptacle.

18. The method of claim 15, further comprising:
capturing, using the imaging device, a second image of the first receptacle;
determining, using the processor, based on the second image, that the first item is not in the empty space of the first layer of items; and
sending, using the processor, a second instruction to the robotic device such that the robotic device causes the first item to be moved.

19. The method of claim 15, further comprising:
determining, using the processor, prior to sending the first instruction, a first size of the first item;
determining, using the processor, prior to sending the first instruction, a second size of the empty space; and
determining, using the processor, based on the first size being at least one of less than equal to the second size, that the first item will fit in the empty space.

20. The method of claim 15, further comprising:
determining, using the processor, prior to sending the first instruction, that the first item is located at a first location within the first receptacle such that the first instruction comprises the first location, the first location comprising at least one of:
a depth of the first item;
a first distance from a first side of the first receptacle; and
a second distance from a second side of the first receptacle; and
determining, using the processor, prior to sending the first instruction, that the empty space is located at a second location, such that the first instruction comprises the second location; and
determining, using the processor, prior to sending the first instruction, a difference between the first location and the second location, such that the first instruction further comprises the difference.

* * * * *